United States Patent [19]

Nioh et al.

[11] Patent Number: 4,501,773
[45] Date of Patent: Feb. 26, 1985

[54] GRANULATION PROCESS

[75] Inventors: Susumu Nioh, Tokyo; Hiroshi Hirayama; Tetsuzo Honda, both of Funabashi; Koji Ishida, Mobara, all of Japan

[73] Assignees: Toyo Engineering Corporation; Mitsui Toatsu Chemicals, Inc., both of Tokyo, Japan

[21] Appl. No.: 387,650

[22] Filed: Jun. 11, 1982

Related U.S. Application Data

[63] Continuation of Ser. No. 191,229, Sep. 26, 1980, abandoned.

[30] Foreign Application Priority Data

Oct. 8, 1979 [JP] Japan ................. 54-129613

[51] Int. Cl.³ .............................. B05D 3/02
[52] U.S. Cl. ................. 427/213; 71/64.06; 71/64.02; 71/64.07; 264/117; 23/313 F
[58] Field of Search ............... 71/64.06, 64.02, 64.07; 427/213; 23/313 FD; 264/117

[56] References Cited

U.S. PATENT DOCUMENTS 4,219,589 8/1980 Niles ..................... 427/213

Primary Examiner—Sam Silverberg
Attorney, Agent, or Firm—Flynn, Thiel, Boutell & Tanis

[57] ABSTRACT

A spouted bed granulation process in which the average particle size of the final product is controlled by employing, as seed particles fed to the granulator, a mixture of particles of at least two different average particle sizes and changing the mixing ratio of the respective particles.

21 Claims, 9 Drawing Figures

AVERAGE PARTICLE SIZE
FRACTION A > FRACTION B

GRANULATION PROCESS

This is a continuation of application Ser. No. 191,229, filed Sept. 26, 1980 now abandoned.

This invention relates to improvements in the granulation process using a spouted bed.

The granulation process using a spouted bed is disclosed to some extent in Japanese Patent Application Laid-Open Specification No. 92715/78 and Japanese Patent Publication No. 47230/78. This known process, however, is defective in that, as described in detail hereinafter, the operation stability is extremely poor in the continuous operation test and the yield of granulated product having a desired particle size, per unit time, is greatly changed.

This invention is based on the results of research carried out to determine the causes of the defects of the conventional process. This invention provides a granulation process in which adjustment of the particle size of the seed particles, which adjustment is indispensable for a granulation process of this type, is performed by a very simple and convenient method and the entire operation can be remarkably stabilized.

BRIEF DESCRIPTION OF THE DRAWINGS

The principle of the granulation process using a spouted bed and the causes of the unstable operation in this process will now be described. FIG. 1 is a diagrammatic illustration of the principle of the granulation process using a spouted bed. In FIG. 1, reference numeral 1 identifies a hollow granulator which contains a solid powdery or granular product moving therein. A hopper-like bottom having the shape of an inverted frustum of a cone or a similar shape (hereinafter referred to as "inverted frusto-conical shape") is formed in the lower portion of the granulator. At the lowermost part of the granulator, there are disposed an air blow-in pipe 3, at least one introduction pipe 2 coaxially arranged in the air blow-in pipe 3 for introducing a concentrated liquid of an adherent and solidifiable substance (hereinafter referred to as "liquid") and a nozzle 7 located at the upper end of the pipe 2, which upper end of pipe 2 is disposed substantially at the juncture of pipe 3 with the lower end of the inverted frusto-conical shape. Fine particles (droplets) of the liquid are sprayed upwardly from the nozzle 7 and are blown into the granulator 1, together with air blown into the granulator 1 at a high flow speed through a blow opening 10. At this point, the high speed air stream blown into the granulator 1 from the blow opening 10 entrains therein solid powdery or granular product in a particle layer 11, which layer is moving downwardly in the lower portion of the granulator 1, whereby to form an upwardly moving jet stream consisting of air, fine liquid particles and solid powdery or granular product in the portion adjacent to the central portion of the granulator. The path of the jet stream is substantially as indicated by the broken lines 6. In this jet stream, respective particles of the solid powdery or granular product are coarsened or enlarged because of adherence and solidification of the fine liquid particles on the surfaces thereof. Because the flow speed of the jet stream is reduced in the upper portion of the granulator 1, the enlarged solid powdery or granular product separates, by gravity, from the air stream. More specifically, the enlarged solid powdery or granular product falls onto the top surface of the particle layer 11 by following the course of flow lines 5 indicated by solid lines in FIG. 1, while air is discharged from the granulator through an air outlet 4.

Figure 1:
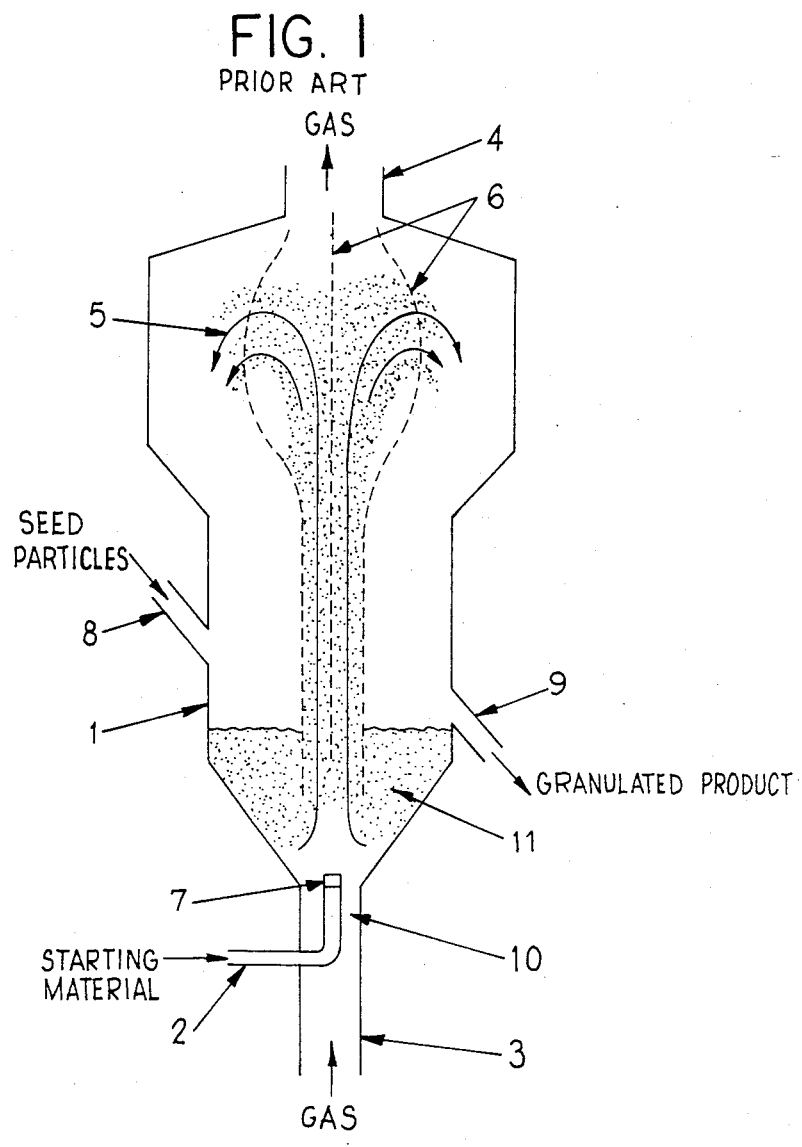
FIG. 1 is a diagrammatic illustration of the principle of operation of a spouted bed type granulator.

According to the above-mentioned operation, the solid powdery or granular product is enlarged in the granulator. When a continuous operation is carried out in this granulator, air is continuously blown into the granulator 1 from the blow-in opening 10 and the liquid is continuously sprayed from the nozzle 7. In this case, the solid powdery or granular product that falls onto the top surface of the particle layer 11, as described above, gradually moves downwardly because the solid powdery or granular product located therebelow is continuously entrained in and blown upwardly by the jet stream and, thereby, the powdery or granular product that has moved downwardly to the bottom of layer 11 is entrained in the jet stream again and is further enlarged in size as described above. Thus, the respective particles of the powdery or granular product present in the granulator 1 undergo the enlarging action of the jet stream repeatedly and they are further enlarged. The size-enlarged solid powdery or granular product (hereinafter referred to as "coarsened product") is continuously withdrawn from a coarsened product withdrawal outlet 9 which communicates with an appropriate position in the particle layer 11, while the necessary amounts of solid particles acting as seed particles (hereinafter referred to as "seed particles") are charged into the layer 11 from an appropriate position, for example, a position 8. In the foregoing manner, the operation is continuously carried out to enlarge the seed particles and to obtain larger particles.

As will be apparent from the foregoing description, the degree of size enlarging of the respective seed particles charged from the charge opening 8 to obtain coarsened particles discharged from the withdrawal outlet 9 depends on the number of repetitions of the enlarging action caused by contact with the jet stream while the particles reside in the granulator. In a granulator of this type, it is substantially impossible to control the movements of respective individual particles so that they can be discharged from the withdrawal outlet 9 after the respective seed particles charged from the charge opening 8 have received the enlarging action a substantially equal number of times. More specifically, seed particles charged from the charge opening 8 reside in the granulator for different periods of time and undergo the enlarging action different numbers of times, and then, the resulting coarsened particles are withdrawn from the withdrawal outlet 9. Accordingly, the coarsened granular product withdrawn from the withdrawal outlet 9 is a mixture of particles of different particle sizes, even if the starting seed particles charged from the charge opening 8 are uniform in particle size. According to experiments made by us, it was confirmed that in the granulator 1, some fine liquid particles are cooled and solidified without having seed particles adhered thereto and/or new seed particles are formed by breakage of particles owing to the vigorous movements of the solid powdery or granular product in the granulator 1 (hereinafter referred to as "newly formed seed particles"). Although the average particle size of the coarsened granular product discharged from the withdrawal outlet 9 is larger than that of the seed particles charged from the charge opening 8 (hereinafter referred to as "charged seed particles") owing to the above-mentioned enlarging action, the particle size distribution range in the withdrawn granular product is much broader than is the particle size distribution range in the charged seed particles. One of the reasons for this is the above-mentioned formation of newly formed seed particles. If the particle size distribution of seed particles charged from the charge opening 8 is changed while the operation is continued under substantially the same conditions in the same granulator, the particle size distribution of the coarsened granular product discharged from the withdrawal outlet 9 also is changed. On the other hand, in order to discharge a coarsened granular product having a certain particle size distribution by predetermined amounts stepwise from the withdrawal outlet 9, it is necessary to charge, from the charge opening 8, predetermined amounts of seed particles having a certain particle size distribution different from that of the coarsened granular product. The number of charged seed particles has a significant influence on the particle size distribution of the coarsened granular product. The foregoing characteristic of the granulator is one of the significant causes of the unstable operation in a granulation system including this granulator. Since the formation of the newly formed seed particles is constant both in the quantity and the particle size distribution under constant operation conditions, the charged seed particles alone will now be described because the charged seed particles participate mainly in the features of this invention.

Figure 2:
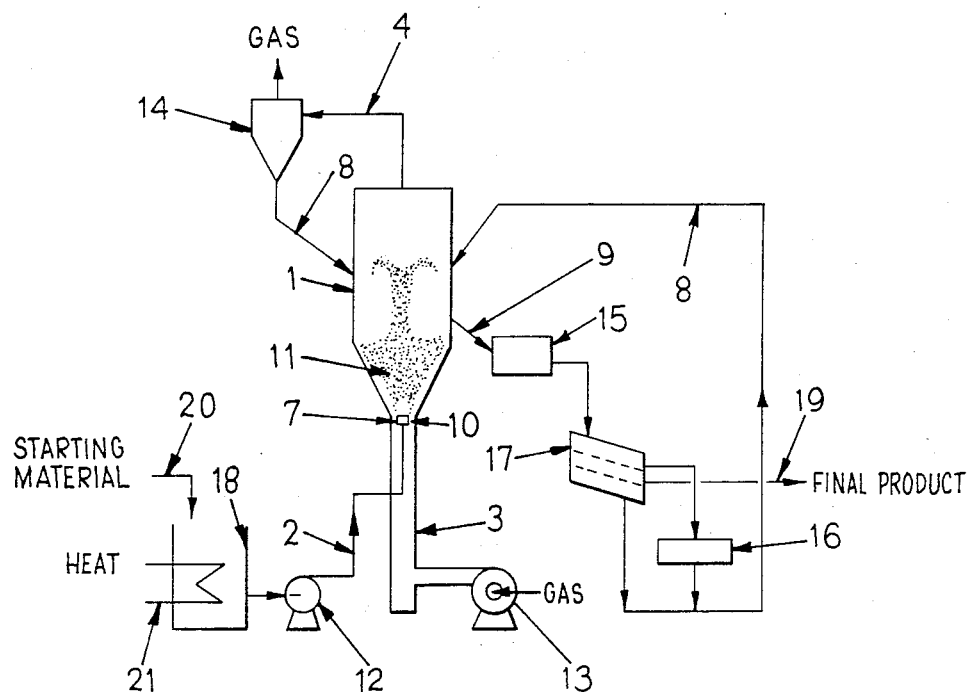
FIG. 2 is a process diagram of the conventional granulation system using a spouted bed type granulator.

In a conventional granulation system including the granulator having the above-mentioned characteristic, a continuous process has been carried out as shown in FIG. 2. In FIG. 2, reference numeral 1 identifies the above-mentioned granulator, and reference numeral 13 identifies a blower for blowing air into the granulator 1 through the pipe 3. Reference numeral 18 identifies a device for melting the starting material by a heat source 21, and reference numeral 12 identifies a pressure pump for spraying the molten liquid into the granulator 1 from the spray nozzle 7 through the pipe 2. An air discharge pipe 4 for discharging air from the granulator 1 is provided with a separator 14, such as a cyclone, for separating solid fine particles carried by the air discharged from the granulator 1 and returning said fine particles to the granulator via the inlet 8. The granulator product coarsened in the granulator 1 is discharged from the withdrawal outlet 9 and is cooled by a cooler 15. As pointed out hereinbefore, the coarsened granular product discharged from the withdrawal outlet 9 is a mixture of particles differing in their particle size, and this product cannot be used as a final product. Accordingly, the cooled coarsened granular product should be classified by a classifier 17 into a fraction of larger granular product having a particle size larger than the desired particle size range, a fraction of granular product having a particle size within the desired particle size range (hereinafter referred to as "final product") and a fraction of smaller powdery or granular product having a particle size range smaller than the desired particle size range. The fraction of larger granular product obtained by this classification can be remelted by the starting material melting device 18 and used again for spraying. This re-melting method, however, should not be employed in usual cases because consumption of energy is increased, the starting material is modified by the repeated melting (in the case of urea, the amount of biuret is increased) and it is desirable that the seed particles to be supplied should be prepared separately. In the conventional process, therefore, there is ordinarily adopted a method in which the fraction of smaller powdery or granular product, the fraction of larger granular product after pulverization by a pulverizer 16 and the solid fine particles separated by the separator 14 are recycled and charged as seed particles into the granulator 1 from the seed particle charge opening 8 (hereinafter referred to as "recycled product").

From the results of experiments, we have confirmed that in the conventional process shown in FIG. 2, the operation is so unstable that continuous operation is impossible. In order to perform the operation stably in the conventional process shown in FIG. 2, it is necessary to stabilize both the quantity and the particle size distribution of the coarsened granular product discharged from the withdrawal outlet 9 (the particle size distribution thus desirably stabilized will be hereinafter referred to as "desired particle size distribution" of the coarsened product). The quantity of the discharged granular product can easily be stabilized by control of the discharge of the coarsened granular product. However, because the particle size distribution of the discharged granular product depends on the particle size distribution of the seed particles, as pointed out hereinbefore, in order to stabilize the particle size distribution of the discharged granular product, it is necessary to control stably the particle size distribution of the seed particles to a level corresponding to the certain desired particle size distribution of the coarsened granular product discharged from the withdrawal outlet 9 (the particle size distribution thus desirably controlled will be hereinafter referred to as "the desired particle size distribution" of seed particles). Of course, at this point, it is necessary that the quantity of the seed particles should be related to the amount of the coarsened granular product withdrawn from the withdrawal outlet 9. Therefore, in order to maintain a certain desired particle size distribution in the coarsened granular product withdrawn from the outlet 9 by predetermined amounts, it is necessary to maintain stable both the quantity and the particle size distribution of the charged seed particles at certain levels. In short, in order to stabilize the operation in the apparatus shown in FIG. 2, the desired particle size distribution of the seed particles should be in agreement with the particle size distribution of the recycled product. In other words, if the particle size distribution of the recycled product is changed, the particle size distribution of the coarsened granular product also is changed, with the result being that each of (1) the quantity of the final product obtained from the coarsened product, (2) the quantity and particle size distribution of the fraction of larger granular product, and (3) the quantity and particle size distribution of the fraction of smaller powdery or granular product is changed. Accordingly, if a recycled product comprised of solid small particles obtained by pulverizing the fraction of larger granular product having the changed quantity and particle size distribution and the fraction of smaller powdery or granular product is used again as seed particles, the particle size distribution in the subsequent coarsened granular product is further changed. Because of repetitions of this phenomenon, in the process as shown in FIG. 2, where solid small particles obtained by pulverizing the fraction of larger granular product and the fraction of smaller powdery or granular product are directly used as the recycled seed particles, there is produced a certain state, called an oscillation state, wherein the frequency and amplitude are varied, rendering stable operation impossible or the particle size distribution of the coarsened granular product is caused to deviate toward the smaller particle size side, making recovery of the desired final product impossible.

As conventional means for eliminating the operational instability in the granulation process, as described above, there can be mentioned a method in which, in order to make the particle size distribution of the recycled product agree with the desired particle size distribution of the seed particles, the recycled product is once classified into various fractions differing in their particle sizes and appropriate amounts of the respective fractions are collected and mixed so as to attain the desired particle size distribution of the seed particles. This method, however, is too complicated and is not preferred from an industrial viewpoint. First of all, if the particle size distribution of the recycled product is not precisely in agreement with the desired particle size distribution of the seed particles, the particle size distribution of the coarsened product gradually deviates from the desired particle size distribution, and this deviation becomes prominent with the passing of time and the above-mentioned unstable state is finally produced. Moreover, it is very difficult to make the particle size distribution of the recycled product precisely agree with the desired particle size distribution of the seed particles. In the second place, since the desired particle size distribution of the seed particles is changed, according to changes of the operation conditions, for example, the output of the final product, it becomes more difficult to make the particle size distribution of the recycled product precisely agree with the desired particle size distribution of the seed particles. In the third place, even if it is intended to make the quantity and particle size distribution of the recycled product agree with those of the seed particles, according to the above-mentioned method, since some of the classified particles are used in large quantities and other classified particles are scarcely used, it becomes necessary to separately prepare special particles having a very narrow particle size distribution range. Because of these disadvantages, the above-mentioned method for making the particle size distribution of the recycled product agree with the desired particle size distribution of the seed particles cannot be satisfactorily employed in large scale commercial operation.

This invention provides a granulation process in which the particle size distribution of the coarsened product can be stably maintained at the desired level very easily without making the particle size distribution of the recycled product agree with the desired particle size distribution of the seed particles. According to a fundamental aspect of this invention, there is provided a granulation process, which is excellent in the operation stability, in which the product intended to be recycled is stored in a state in which it is classified into a fraction A of a smaller powdery or granular product size and a fraction B of solid small particles having a smaller average particle size than fraction A so that the two fractions A and B can be mixed in selected proportions for recycling and feeding as seed particles to the granulator, and in which if the average particle size of the powdery or granular product discharged from the granulator tends to increase, the feed ratio of the two fractions A and B is changed so as to make the average particle size of the recycled product smaller than the average particle size of the recycled product before the change, so that an excessive increase of the average particle size of the coarsened product, otherwise caused by the resulting above-mentioned oscillation state, is prevented and the content of the larger granular product in the coarsened product is prevented from exceeding 10 wt. %, and if the average particle size of the coarsened product discharged from the granulator tends to decrease, the feed ratio of the above two fractions A and B is changed to make the average particle size of the recycled product larger than the average particle size of the recycled product before the latter change so that an excessive decrease of the average particle size of the coarsened product, otherwise caused by the resulting above-mentioned oscillation state, is prevented and the content of the smaller powder or granular product (fraction A) is prevented from exceeding 75 wt. %, whereby variations of the particle size distribution of the coarsened product are controlled to a tolerable minimum level.

According to a secondary aspect of this invention, there is provided a granulation process, which is excellent in the operation stability, in which the solid small particles (fraction B) used for performing the above control are of at least one kind selected from the group consisting of (1) solid small particles separated from the fraction A of smaller powdery or granular product, (2) solid fine particles separated from the exhaust air from the granulator or other part of the system, (3) solid small particles obtained by pulverization of the fraction of larger size granular product, (4) starting small solid particles to be used for formation of the starting concentrated liquid for spraying and (5) solid small particles of a chemical component to be incorporated into the final granular product, different from the component contained in sprayed particles of the concentrated liquid. The selected solid particles are gathered into one group or are re-arranged into two groups differing in the average particle size and they are used for the above-mentioned change of the feed ratio.

In this invention, setting of the time for performing the change of the feed ratio of the two fractions A and B for recycling is important. Even if the feed ratio is changed, it is only after a certain period of time has passed that the intended control effect is actually attained. This time lag varies depending on the characteristics of the apparatus or the operation conditions as described hereinafter. Therefore, it is necessary to set and change the timing of changing the feed ratio of the two fractions A and B for recycling according to the characteristics of the apparatus and the operation conditions. Furthermore, as described in detail hereinafter, in this invention, the particle size distribution or average particle size of the coarsened product need not be directly detected and it is important that there is an inverse correlation established between the amounts of the granular product larger than the desired product and the smaller powdery or granular product in the coarsened product. More specifically, the change of the average particle size of the seed particles, which is an indispensable factor for carrying out this invention, can be established without direct detection, for example, by detecting the flow amount of the fraction A of smaller powdery or granular product. Furthermore, since an increase or decrease of the content of the larger granular product in the coarsened product should inevitably be manifested as a decrease or an increase, respectively, of the content of the smaller powdery or granular product, the change of the content of the larger granular product can be known by detecting the flow amount of the smaller powdery or granular product. Accordingly, in the case where a change of the average particle size of the coarsened product is detected, based on the flow amount of the smaller powder or granular product as in the above example, the flow amount of the smaller powdery or granular product is frequently detected and traced, and if this flow amount is decreasing (that is, the average particle size of the coarsened product is increasing), a certain value of the flow amount is tentatively set (hereinafter referred to as "first set value"). When the flow amount passes through this first set value from a larger flow amount toward a smaller flow amount, the above-mentioned change of the feed ratio of fractions A and B is performed, whereby formation of an excessive amount of the larger granular product is prevented in advance. This first set value may be changed by an operator according to the characteristics of the apparatus or the operation conditions. On the other hand, if the flow amount is increasing (that is, the average particle size of the coarsened product is decreasing), another value is tentatively set for the flow amount (hereinafter referred to as "second set value"), and when the flow amount passes through this second set value from a smaller flow amount toward a larger flow amount, a reverse change of the feed ratio of fractions A and B is performed, whereby formation of an excessive amount of the smaller powdery or granular product is prevented in advance. Also, this second set value can be changed by the operator according to the characteristics of the apparatus or the operation conditions. This invention can be conveniently carried out either manually or automatically in the above-mentioned manner. This invention will now be described in more detail with reference to the accompanying drawings.

Figure 3:
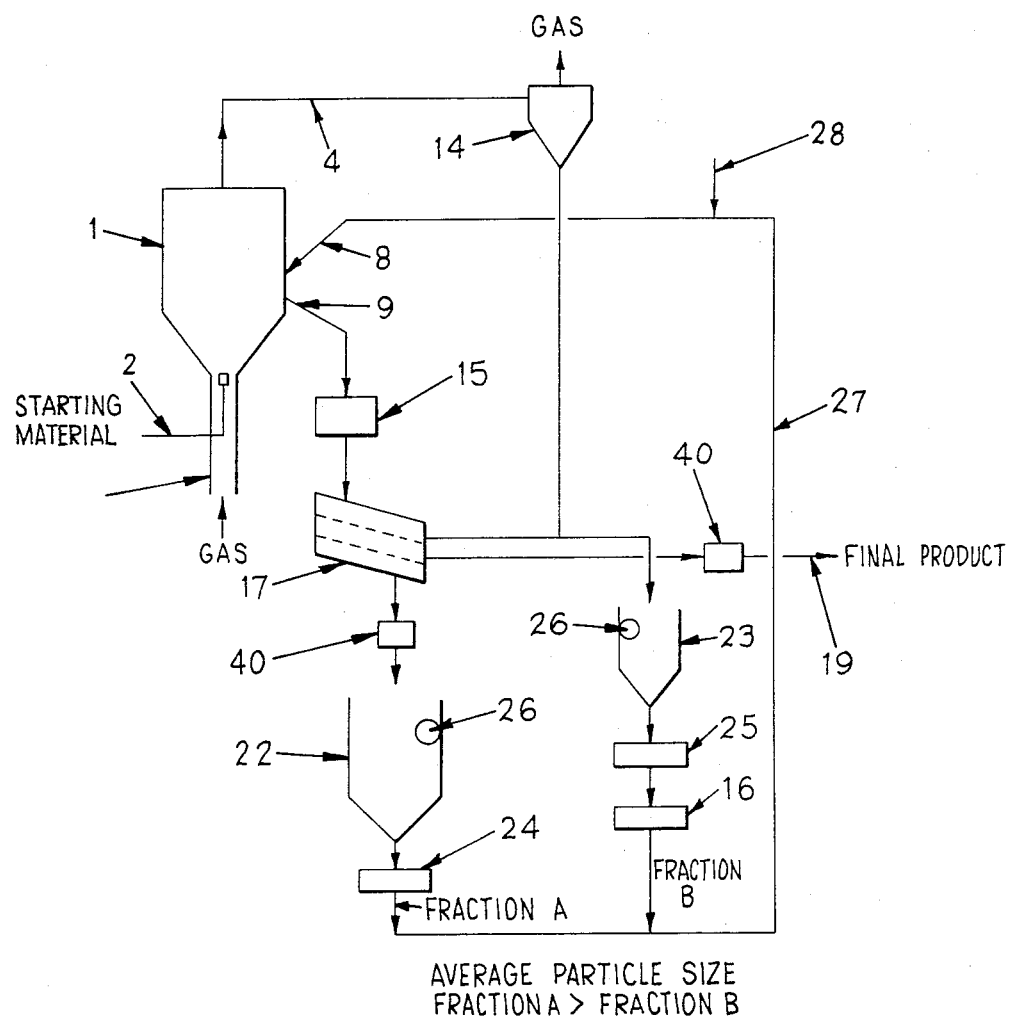
FIGS. 3 to 9 are process diagrams illustrating embodiments of this invention.

First, an embodiment shown in FIG. 3 is described. In this embodiment, the recycled product comprising the smaller powdery or granular product (fraction A) and one group of solid small particles (fraction B) is used and the flow amount of the smaller powdery or granular product is employed for detecting the change of the average particle size of the coarsened product. However, this invention is not limited to the embodiment shown in FIG. 3. Additional embodiments are shown in other drawings and the examples described hereinafter.

Referring to FIG. 3, the solid powdery or granular product in the granulator 1 is taken out as a coarsened product from the outlet 9, and it is appropriately cooled by a cooler 15 and classified, by a classifier 17, into three fractions of (1) a final product, (2) a larger granular product having a larger particle size and (3) a smaller powdery or granular product having a smaller particle size. The final product is discharged from a discharge outlet 19. The smaller powdery or granular product is passed through a flow meter 40 and is stored in a storage tank 22. The larger granular product is stored in a storage tank 23 together with the solid fine particles removed by the separator 14 disposed in the air outlet pipe 4. Level detectors 26 are provided in tanks 22 and 23 to detect the levels of contents therein. A metered amount of the smaller powdery or granular product stored in the tank 22 is taken out by a feeder 24 (fraction A). A metered amount of the larger granular product and solid fine particles stored in the tank 23 is taken out by a feeder 25 and is pulverized by a pulverizer 16 so that the average particle size thereof becomes smaller than the average particle size of the smaller powdery or granular product in the storage tank 22 (fraction A). Then, both the granular products from feeder 24 and pulverizer 16 (fractions A and B) are charged as recycled product by means of transporting means 27 into the granulator 1 from the seed particle charge opening 8.

According to this invention, the above-mentioned apparatus is operated in the following manner. In the apparatus shown in FIG. 3, the operation is conducted be setting the amount of the concentrated liquid sprayed in through pipe 2, the feeding amount of the smaller powdery or granular product from feeder 24 (fraction A), and the feeding amount of the solid small particles from pulverizer 16 (fraction B) at appropriate levels. Assuming that at a certain point in this continuous operation, the particle size distribution of the coarsened final product changes toward a larger average particle size because of the operational instability of the apparatus, this change can be detected because it reduces the flow amount of the smaller powdery or granular product flowing into tank 22 in the apparatus shown in FIG. 3. If the above operation state is continued without any adjustment, the average particle size of the coarsened final product is increased to an undesirable level and the content of the larger granular product in the powdery or granular product discharged from the granulator and fed into tank 23 exceeds 10 wt. %. During this period, the flow amount of the smaller powdery or granular product continues to decrease, and the level of the smaller powdery or granular product in the storage tank 22 is lowered and finally is reduced to zero. At this point, the feed amount of the smaller powdery or granular product (fraction A) for recycling is abruptly reduced. This change results in a reduction of the total feed amount of the recycled product and also results in a relative increase of the amount of the solid small particles from pulverizer 16 (fraction B) present in the recycled product. The particle size distribution of the recycled product is abruptly changed toward the smaller average particle size side (particle size of fraction B). This change in turn results in an abrupt elevation of the temperature in the granulator owing to the abrupt decrease of the feed amount of the recycled product. Simultaneously, as the result of the mutual action of three causes, that is, (1) the increase of the average particle size owing to the reduction of the amount fed of the recycled product and (2) the decrease of the average particle size owing to the abrupt change of the average particle size of the recycled product toward the smaller particle size side and (3) the adjustment of the amount discharged of the coarsened final product, which should be performed corresponding to the result of causes (1) and (2) and the above-mentioned abrupt decrease of the feed amount of the recycled product, the particle size distribution of the coarsened product is changed in a very complicated manner, with the result being that the operation cannot be satisfactorily performed for practical commercial purposes. This undesirable phenomenon cannot be prevented entirely even if the storage capacity of the storage tank 22 for the smaller powdery or granular product is increased. In this invention, in order to prevent the occurrence of this undesirable phenomenon, when the average particle size of the coarsened final product is increased beyond a certain level corresponding to the characteristics of the apparatus or the like, that is, the above-mentioned first set value (the flow amount of the smaller powdery or granular product is decreased below the first set value in the apparatus shown in FIG. 3), the weight ratio of the feed amount of the solid small particles fraction B (from pulverizer 16) to the amount supplied of the smaller powdery or granular product fraction A (from feeder 24) is changed to make the average particle size of the recycled product smaller than the average particle size before the change so that the change of the average particle size of the coarsened product toward the larger particle size side is prevented from becoming excessive. By this change of the feed ratio of the fractions A and B of the recycled particles used as seed particles, the effect of changing the average particle size of the coarsened product toward the smaller particle size side is manifested after the passage of a certain time (so-called time lag). If the operation is continued without any adjustment after this change of the average particle size of the coarsened product toward the smaller particle size side, the average particle size of the coarsened product is kept reduced and for example, the flow amount of the smaller powdery or granular product that flows into tank 22 is increased until the content of the smaller powdery or granular product in the coarsened product exceeds 75 wt. %. During this period, the flow amount of fraction A continues to increase, with the result being that the storage tank 22 for the smaller powdery or granular product overflows, the flow amount of the final product is reduced and the quantity of the larger granular product stored in tank 23 is reduced to zero owing to excessive reduction of the flow amount of the larger granular product, whereby an undesirable phenomenon of another change of the operation state is caused. In this invention, occurrence of this undesirable phenomenon is prevented in the following manner. In the case where the average particle size of the coarsened product is decreasing, when the average particle size of the coarsened product is reduced below a certain level according to the characteristics of the apparatus or the like, that is, the second set value (the flow amount of the smaller powdery or granular product exceeds the second set value in the apparatus shown in FIG. 3), in order to prevent excessive reduction of the average particle size of the coarsened product, the weight ratio of the feed amount of the solid small particles of fraction B from pulverizer 16 to the amount of the smaller powdery or granular product fraction A supplied by feeder 24 is changed so that the average particle size of the recycled product is made larger than the average particle size before the change. By this latter change of the feed ratio of fractions A and B, an effect of increasing the average particle size of the coarsened product is manifested after a certain time lag determined according to the apparatus. Since the particle size of the coarsened product then increases, the feed ratio of the fractions A and B is changed at an appropriate point by using the first set value in the same manner as described above, and the operation of changing the feed ratio is thus repeated.

In this invention, the particle size distribution of the coarsened product is controlled in advance by changing the weight ratio of the feed amount of the solid small particles fraction B from pulverizer 16 to the amount supplied of the smaller powdery or granular product fraction A from feeder 24 in the above-mentioned manner so that an excessive amount of the larger granular product or the smaller powdery or granular product is not formed, whereby the operation is stabilized. Adoption of the first and second set values in the above illustration is an auxiliary means for facilitating selection of the appropriate time for changing the above-mentioned feed ratio of the fractions A and B fed as seed particles into the granulator. The specific numerical values of the first and second set values are changed according to the method of detecting the change of the average particle size of the coarsened product, which is described hereinafter, the characteristics of the granulation apparatus. The intended particle size range of the final product, the allowable variation of the yield of the final product per unit time and the time lag for manifestation of the effect of changing the average particle size in the coarsened product after performance of the change of the feed ratio of the fractions A and B. The first set value is determined as an index for selecting the time at which the above-mentioned feed ratio is changed so as to reduce the average particle size of the recycled product while the average particle size of the coarsened product is increasing. This first set value is a value of a certain variable which corresponds to a time point when the average particle size of the coarsened product has between (i) the average particle size of the coarsened product at the point when the effect caused by the preceding change of the feed ratio is manifested and the tendency of the average particle size of the coarsened product to decrease is converted to the tendency of this average particle size to increase (that is, the permissible minimum average particle size) and (ii) the particle size value obtained by subtracting the increase of the average particle size during the period of the time lag from the permissible maximum average particle size. The second set value is determined as an index for selecting the time at which the feed ratio is changed to increase the average particle size of the recycled product while the average particle size of the coarsened product is decreasing. This second set value is a value of a certain variable which corresponds to a time point when the average particle size of the coarsened product lies between (i) the average particle size of the coarsened product at the point when the effect by the preceding change of the feed ratio is manifested and the tendency of the average particle size of the coarsened particle to increase is converted to the tendency of the average particle size to decrease (that is, the permissible maximum average diameter) and (ii) the particle size value obtained by adding the decrease of the average particle size during the period of the time lag to the permissible minimum average particle size. When these first and second set values are determined, it sometimes happens that both the set values become the same according to the above-mentioned various factors concerning the determination of the set values. When the flow amount of the smaller powdery or granular product into tank 22 is used as a means for detecting the change of the particle size of the coarsened product in the method shown in FIG. 3, the average particle size values of the coarsened product corresponding to each of the set values are, of course, different from the respective set values determined when its average particle size is directly used as detecting means in the above-mentioned manner. More specifically, the flow amount of the smaller powdery or granular product into tank 22 has an inverse relation to the average particle size of the coarsened product (that is, while the average particle size of the coarsened product is increasing, the flow amount of the smaller powdery or granular product is decreasing).

Therefore, when the flow amount of the smaller powdery or granular product is used for determination of the first and second set values, specific means corresponding to this inverse relation should be adopted, and, of course, this is one of the embodiments included in the scope of this invention.

According to experiments made by us, it was confirmed that it is preferred that the average particle size of the solid small particles fraction B be ⅔ to 1/30 of the average particle size of the smaller powdery or granular product fraction A. For example, in the embodiment shown in FIG. 3, if the average particle size of the solid small particles fraction B from pulverizer 16 is larger than ⅔ of the average particle size of the smaller powdery or granular product fraction A from feeder 24, the effect caused by the change of the feed ratio of both types of particles is not prominent. On the other hand, if the average particle size of the solid small particles fraction B from pulverizer 16 is smaller than 1/30 of the average particle size of the smaller powdery or granular product fraction A from feeder 24, even by a slight change of the feed ratio of fractions A and B, the number of seed particles is excessively increased or decreased, and the particle size is excessively reduced, with the result being that some of the seed particles are carried off by the air stream and are discharged out of the granulator 1 and control of the number of the supplied seed particles becomes uncertain.

The first characteristic feature of this invention is that even if a designer or operator does not know precise details of the desired particle size distribution of the coarsened product or the desired particle size distribution of the seed particles, he can design and arrange the apparatus and process so that the granulation operation can be performed stably. The desired particle size distributions of the coarsened product and seed particles vary according to the design of the apparatus and it is very difficult to estimate or foresee these desired particle size distributions in advance of an actual operation. Moreover, they vary according to the operation conditions, for example, the amount of the concentrated liquid sprayed from the nozzle 7, the ratio of the amount charged of the seed particles to the amount sprayed of the concentrated liquid and the change of the vigorous agitation state in the granulator 1 owing to the change of the amount of air blown into the granulator 1. Accordingly, since the desired particle size distributions of the coarsened product and the seed particles are thus changed according to the structural features of the apparatus and the operation conditions, it is very difficult to know in advance details of these desired particle size distributions and arrange them according to these factors. Furthermore, even if details of the desired particle size distributions of the coarsened product and seed particles are known, according to the above-mentioned prior art process in which the smaller powdery or granular product and the solid small particles are classified into many fractions which slightly differ from each other in particle size, by using many sieves differing in the mesh size, and appropriate amounts of these fractions are blended to obtain a recycled product having a particle size distribution corresponding to the desired particle size distribution of seed particles, there are excesses and deficiencies in the amounts of the respective classified fractions. In this case, the excess portions of fractions can be sprayed in the form of the concentrated liquid, but the deficiencies in the amounts of other fractions must be made up separately. Therefore, various difficulties are involved in the design of the apparatus and/or the operation, although it is not absolutely impossible to carry out the process. According to this invention, these difficulties are overcome and eliminated, and the operation can be stabilized very easily and conveniently.

The second characteristic feature of this invention is that, referring to the embodiment shown in FIG. 3, if only there is a certain difference between the average particle size of the smaller powdery or granular product fraction A from feeder 24 and the average particle size of the solid small particles fraction B from pulverizer 16, a good operation stability can be maintained even when the average particle sizes of both fraction A and fraction B particles change with the passing of time. As pointed out hereinbefore, the particle size distributions are readily changed, and changes of the average particle sizes of the smaller powdery or granular product fraction A and the solid small particles fraction B with the passing of time, owing to such changes of the particle size distributions, indicate that the effect caused by the change of the above-mentioned feed ratio on the change of the particle size distribution of the coarsened product is not constant, but rather, varies. However, in this invention, even if the effect caused by the change of the feed ratio is changed with the passing of time, the operation can be stabilized simply by changing the frequency of performing the change of the feed ratio of fractions A and B. Also in this connection, the process of this invention is more advantageous compared to the conventional process described above with respect to the first characteristic feature.

The third characteristic feature of this invention is that even when the particle size distribution of the smaller powdery or granular product fraction A or the solid small particles fraction B changes with the passing of time, provided that a certain difference is maintained between the average particle sizes of fractions A and B, the operation stability can be guaranteed without any trouble. The influences of the changes of the particle size distributions of fractions A and B with the passing of time can easily be coped with simply by changing the frequency of performing the above-mentioned feed ratio change as described above with respect to the second characteristic feature.

The fourth characteristic feature of this invention is that, referring to the embodiment shown in FIG. 3, if there is a certain difference between the average particle sizes of the smaller powdery or granular product fraction A from feeder 24 and the solid small particles fraction B from pulverizer 16, the operation stability can be substantially maintained simply by adjusting the feed amount of the solid small particles fraction B from pulverizer 16. The granulation process of this invention is based on the principle that the respective seed particles charged in the granulator 1 undergo the coarsening action and are converted to coarsened particles and these coarsened particles are discharged from the withdrawal outlet 9. Accordingly, if the seed particles charged in the granulator 1 are reduced in their average particle size and the number of the seed particles is increased while the weight thereof is kept substantially constant, the particle size distribution of the coarsened product deviates toward the smaller particle size side. For example, in a case where the average particle size of the solid small particles from pulverizer 16 is 1/10 of the average particle size of the smaller powdery or granular product from feeder 24, the total number of particles in (I) a mixture of (1) 99% by weight of smaller powdery or granular product having the average particle size of the smaller powdery or granular product (fraction A) and (2) 1% by weight of solid small particles (fraction B), is more than 10 times the number of particles in (II) a smaller powdery or granular product consisting of 100% by weight of particles all having the average particle size of the smaller powdery or granular product (fraction A), even though the weights of (I) and (II) are equal. When the difference of the average particle size between the smaller powdery or granular product fraction A from feeder 24 and the solid small particles fraction B from pulverizer 16 is as large as mentioned above, the particle size distribution of the coarsened product can be controlled simply by increasing or decreasing the feed amount of the solid small particles fraction B, and the feed amount of the smaller powdery or granular product fraction A need not be changed. According to experiments made by us, it was confirmed that when the average particle size of the solid small particles fraction B is less than 1/5 of the average particle size of the smaller powdery or granular product fraction A, the operation can be stabilized by changing the above-mentioned feed ratio only by adjusting the feed amount of the solid small particles fraction B. In this case, the feeding capacity of the feeder 25 for the pulverizer 16 can be much smaller than that of the feeder 24.

The fifth characteristic feature of this invention is that the consumption of energy amount, per unit of product, can be reduced by lowering a recycle ratio. At that time, a bed temperature increases, but the energy-saving effect can be improved because the upper limit of the bed temperature is higher than in case of prior processes. A high temperature is ordinarily necessary for spraying the concentrated liquid. This means that in the jet stream type granulation process, the solid powdery or granular product in the granulator is softened or molten if the temperature is excessively elevated. If low temperature seed particles composed mainly of the recycled product are charged, excessive elevation of the temperature within the granulator can be prevented and a high cooling effect can be obtained. Accordingly, in the process shown in FIG. 2, wherein recycle of the smaller powdery or granular product and the solid small particles is performed without any particular control over the amounts thereof, the amount of the recycled product greatly varies, resulting in a great variation of the temperature within the granulator, and therefore, if the temperature within the granulator is elevated excessively, agglomeration of the solid particles in the granulator is caused by softening and melting and large agglomerated particles are formed. In contrast, according to the process of this invention, the amount the recycled product is stabilized and the variation of the temperature within the granulator is remarkably reduced. By virtue of this effect, as well as the effect of stabilizing the particle size distribution of the coarsened product, the amount of the recycled product can be reduced to enhance the manufacturing capability of the granulator and both the energy for cooling the recycled product per unit amount of the final product and the power for circulation of the recycled product per unit amount of the final product can be reduced. According to experiments made by us, it was confirmed that in the granulation of urea, although the upper limit of the temperature is 90° C. and the lower limit of the ratio of the amount recycled of the recycled product to the amount sprayed in of molten urea is 1.5 in the process disclosed in Japanese Patent Application Laid-Open Specification No. 92715/78, the upper limit of the temperature is 120° C. and the lower limit of the amount recycled of the recycled product to the amount sprayed in of molten urea is reduced to 0.05 in the process of this invention.

Factors important for carrying out this invention having the above-mentioned characteristic features will now be described with reference to the embodiment shown in FIG. 3. The first important factor is the method for detecting the change of the particle size distribution of the coarsened product. In carrying out this invention, it is most preferred that the particle size distribution of the coarsened product be directly detected without any time lag, and laser beams may be used for attaining this purpose. As another preferred detecting method that can be adopted in lieu of this direct detecting method, there can be mentioned not only the method for detecting the flow amount of the smaller powdery or granular product in the embodiment shown in FIG. 3, but also a method for detecting the flow amount of the final product, a method for detecting the ratio of the flow amount of the smaller powdery or granular product to the flow amount of the coarsened product, a method for detecting the ratio of the flow amount of the final product to the flow amount of the coarsened product, a method for detecting the ratio of the flow amount of the smaller powdery or granular product to the flow amount of the final product and a method for detecting the level of the stored particles in the storage tank 22 for the smaller powdery or granular product. The quantity detected according to any of these detecting method can have either a corresponding or an inverse correlation to the change of the average particle size of the coarsened product, depending on the detecting method employed. Accordingly, the above-mentioned first and second set values can be determined as specific values of the detected quantities according to whichever detecting method is selected and the corresponding or inverse correlation to the average particle size of the coarsened product.

The second important factor for carrying out this invention is the relation between (a) the time lag from the time of effecting the change of the ratio of the feed amount of the solid small particles fraction B to the amount supplied of the smaller powdery or granular product fraction A to the time of detection of the effect as the reciprocal of the average particle size of the coarsened product (hereinafter referred to as "time lag of the effect") and (b) the ratio of (1) the amount of the smaller powdery or granular product (fraction A) resident in the system from the coarsened product discharge end of the granulator to the seed particle introduction end of the granulator through the recycle passage, to (2) the amount of the powdery or granular product resident in the granulator (hereinafter referred to as "resident amount ratio"). In the granulation apparatus of this type, the time lag of the effect is relatively long. Accordingly, in the embodiment of the process of this invention illustrated in FIG. 3, while the average particle size of the coarsened product is changed toward the larger particle size and hence, the flow amount of the smaller powdery or granular product fraction A is decreasing and the level of the particles in the storage tank 22 for the smaller powdery or granular product is being reduced, even if the feed ratio is changed at the point when the flow amount of the smaller powdery or granular product is reduced below the first set value, the level of the particles in the storage tank 22 for the smaller powdery or granular product is still reduced during the period of the time lag of the effect. Accordingly, it is necessary to maintain the resident amount ratio above a certain level so that the operation is not hindered by reduction of the stored amount in the above storage tank 22 to zero. According to experiments made by us, it was confirmed that the resident amount ratio should be at least 1.0 wherein also the case where the flow amount of the smaller powdery or granular product is increasing, contrary to the above mentioned case, is taken into consideration. However, an excessive resident amount ratio, especially an excessive stored amount in the storage tank 22 from the smaller powdery or granular product, which is the main factor for determining the resident amount ratio, has undesirable influences on the practice of the process of this invention. More specifically, it is very difficult to homogenize the stored particles by stirring and blending the particles in the storage tank 22 for the smaller powdery or granular product, and also breakage of the particles and increase of the consumption of the power are caused by such measures. Therefore, an excessive resident amount ratio should be avoided. Even if the process of this invention is adopted, the average particle sizes of the coarsened product and the smaller powdery or granular product are increased or decreased to some extent at irregular intervals. Therefore, if an excessively large storage tank 22 is used for the smaller powdery or granular product and stirring is not effected, layers of the smaller powdery or granular product varying in the average particle size to some extent over several cycles are stored in the storage tank 22. If the thus-stored smaller powdery or granular product is recycled, the average particle size of the coarsened product is changed in relation with the change of the average particle size in the storage tank 22. This phenomenon means that the control of the average particle size of the coarsened product caused by the change of the above-mentioned feed ratio to fractions A and B, can be interfered with by the average particle size of the coarsened product before several cycles. This interference is not preferred in order to highly exert the effects of this invention. According to experiments made by us, it was confirmed that this interference is not caused if the resident amount ratio is up to 20.

The third important factor for carrying out this invention is the kind of the powdery or granular product that is used as the solid small particles fraction B. The solid small particles fraction B that can be used in this invention are divided into two groups, that is, solid small particles formed in the granulating apparatus and those supplied from the outside. As the former solid small particles, there can be mentioned solid small particles having a relatively small particle size which are contained in the smaller powdery or granular product and are separated therefrom, solid fine particles which are carried by the exhaust air from the granulator or air-cooling cooler of the granulating apparatus and separated therefrom and solid small particles obtained by pulverizing the larger granular product to a desirable particle size by the pulverizer 16. In short, all of the powdery or granular products formed in the granulating apparatus can be used according to the average particle sizes thereof. As the latter solid small particles, there can be mentioned starting solid small particles to be used for formation of the starting concentrated liquid. These solid small particles are used when an increase of the quantity of seed particles is desired for controlling the temperature within the granulator, as mentioned above, or when the difference of the average particle size between the starting solid and the final product is relatively small and the degree of coarsening or size enlargement may be relatively low. In this case, the energy or subsidiary material can be saved if a part of the starting solid is used in the solid state, even though the remainder of the solid can be formed into a concentrated liquid. Therefore, this embodiment is advantageously adopted when urea granulated according to the conventional process is further coarsened. As another example of the latter solid small particles, there can be mentioned solid small particles composed of a chemical component to be incorporated into the final product, other than the component contained in the sprayed particles of the concentrated liquid. A starting material that is hardly sprayed in the form of a concentrated liquid because of its low solubility, its high melting point or high tendency to be denatured is used as such solid small particles. For example, there can be mentioned potassium chloride in case of the manufacture of a granular composite fertilizer comprising ammonium phosphate, urea and potassium chloride.

Among the solid small particles that can be used in this invention, some solid small particles have a stable particle size distribution and in other solid small particles, the particle size distribution is not stable. Furthermore, in some solid small particles, the particle size distribution or average particle size can easily be controlled and in other solid small particles, control of the particle size distribution or average particle size is difficult. When these powdery or granular products are used in this invention, in order to enhance the effects of this invention, it is important that these powdery or granular products should be used by combining the characteristics of the powdery or granular products appropriately.

The fourth important factor for carrying out this invention is the manner of using the solid small particles. Among the above-mentioned various powdery or granular products that can be used as the solid small particles in this invention, those having a stable particle size distribution are partially or entirely excluded from the object of the above-mentioned change of the feed ratio of fractions A and B. For example, these solid small particles can be directly charged into the granulator quantitatively from the seed particle charge opening 8 or from the position 28 in the course of transporting means 27 in FIG. 3.

However, in order to stabilize the operation in the granulating apparatus, it is preferred that solid small particles, in which the particle size distribution is changed even only slightly, be used as a component used in the above-mentioned change of the feed ratio. The method in which a plurality of powdery or granular products that can be used as the solid small particles are combined into one kind of solid small particles and the above-mentioned change of the feed ratio is performed between such combined solid small particles fraction B and the small powdery or granular product fraction A has been described hereinafter. Furthermore, a method in which a plurality of powdery or granular products that can be used as the solid small particles are classified into two kinds of solid small particles, one having a medium average particle size range (fraction B-1) and the other having a small average particle size range (fraction B-2), and the above-mentioned change of the feed ratio is performed among these two kinds of solid small particles (fractions B-1 and B-2) and the smaller powdery or granular product (fraction A) is important for enchancing the effects of this invention and further improving the operation stablity. More specifically, in this method, the variation of the particle size distribution of the coarsened product can be made smaller than in the above-metioned method in which the change of the feed ratio is performed between one kind of solid small particles (fraction B) and the smaller powdery or granular product (fraction A), with the result being that the effect of stabilizing the operation can be further enhanced. A plurality of powdery or granular products can be classified into two kinds of solid small particles having a medium average particle size (fraction B-1) and a small average particle size (fraction B-2), for example, in the following manner. Solids carried by the exhaust air from the granulator or air cooler for cooling the coarsened product and separated therefrom have a small average particle size. Accordingly, these solids are directly used as solid small particles having a small particle size (fraction B-2). Particles obtained at classification of the smaller powdery or granular product, particles separated from the smaller powdery or granular product according to a method described below in the embodiments of the invention illustrated in FIGS. 4 and 6 and particles obtained by pulverization of the larger granular product ordinarily have an average particle size larger than that of the above-mentioned particles separated from the exhaust air. Therefore, these particles obtained an classification, separation or pulverization are used as the solid small particles having a medium average particle size and a small particle size, after appropriate control of the average particle sizes thereof, according to need, while maintaining an appropriate quantitative ratio between the two kinds of the solid small particles. These two kinds of the re-arranged solid small particles are independently stored so that the feed amounts thereof can be independently controlled, and the feed ratio is changed among these two kinds of the solid small particles (fractions B-1 and B-2) and the smaller powdery or granular product (fraction A).

Figure 4:
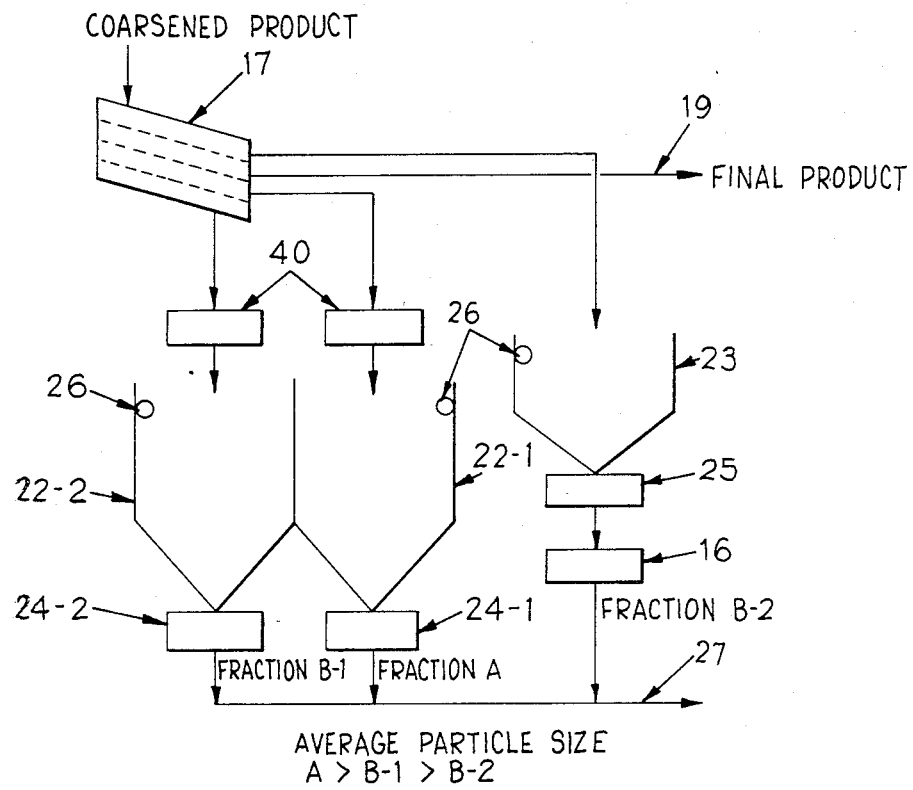

Various means can be adopted for performing the change of the feed ratio among the three kinds of particles. For example, there can be mentioned a method in which the particles having a medium particle size (fraction B-1) are fed constantly and the feed ratio is changed between the particles having a small particle size (fraction B-2) and the small powdery or granular product (fraction A), a method in which the particles having a small particle size (fraction B-2) are fed constantly and the feed ratio is changed between the particles having a medium particle size (fraction B-1) and the small powdery or granular product (fraction A), a method in which the feed ratio between the particles having a medium particle size (fraction B-1) and the particles having a small particle size (fraction B-2) is fixed and the feed ratio is changed between the smaller powdery or granular product (fraction A) and the sum of the two kinds of the solid small particles (fractions B-1 and B-2) and a method in which the feed ratio between the smaller powdery or granular product (fraction A) and the particles having a medium particle size (fraction B-1) is fixed and the feed ratio is changed between the particles having a small diameter (fraction B-2) and the sum of the smaller powdery or granular product and the particles having a medium particle size (fractions A and B-1). In the granulation process of this invention, either in the case where one kind of solid small particles (fraction B) is used or in the case where two kinds of solid small particles (fractions B-1 and B-2) are used, the amount of the smaller powdery or granular product (fraction A) or the amount of the smaller powdery or granular product exclusive of the particles having a small particle size in the latter case, is larger. In the case where three kinds of the particles are employed, the method for performing the change of the feed ratio is appropriately determined according to the quantities of the three kinds of particles, variations of the quantities, the particle size distributions of the three kinds of particles and variations of chemical components. An embodiment of this invention where the change of the feed ratio is effected among the three particles is illustrated in FIG. 4. According to this embodiment, the coarsened product is sieved at 17 and is classified into the larger granular product, the final product and the smaller powdery or granular product. For this classification, a three-staged sieving machine is used so that separation of particles having a small particle size from the smaller powdery or granular product is effected simultaneously with the classification. The smaller powdery or granular product (fraction A) is fed into storage tank 22-1, and the particles having a small particle size are fed into storage tank 22-2. The so-separated particles fed into tank 22-2 are used as the solid small particles having a medium particle size (fraction B-1), while particles obtained by pulverizing the larger granular product are used as the solid particles having a small particle size (fraction B-2).

A molten liquid is ordinarily used as the liquid to be sprayed into the granulator 1 in this invention. If necessary, there can be employed a method in which water or other solvent is incorporated to form a concentrated liquid solution and a predetermined amount of such solvent is evaporated by utilizing the known drying power possessed by the granulator to lower the temperature within the granulator and adjust the solvent content in the final product. This method for incorporating a solvent into the liquid to be sprayed is preferred when the substance to be granulated is difficult to melt in the absence of a solvent or is readily modified or denatured at a temperature lower than its melting point. Needless to say, when an organic solvent is used as the solvent in this embodiment, an inert gas such as nitrogen should be used, instead of air, as the gas to be blown into the granulator.

However, the use of the solvent ordinarily weakens the strength of particles to some extent, and when the respective powdery or granular products are handled in carrying out this invention, formation of solid fine particles is promoted by friction and breakage, resulting in a reduction of the effect of this invention. In this case, an appropriate chemical is added, according to the intended use of the final granular product, whereby the strength of particles can be increased. For example, in the granulation of urea, reduction of the melting temperature by incorporation of water as the solvent is important for preventing formation of biuret by thermal decomposition of urea. In this case, if formaldehyde in an amount of up to 1 % by weight, based on the urea, is added in the form of a formalin solution to water and the mixture is used for spraying urea, an excellent effect of preventing formation of solid fine particles can be attained.

The devices and methods which are used for detecting changes of the particle size distributions of the solid powdery or granular product and coarsened product in the granulator are as described hereinbefore. The detecting devices will now be described more specifically. As the flow meter, a belt scale flow meter is preferably used for carrying out this invention. All of the known devices customarily used for the treatment of powders and granules can be used as the cooler 15, classifier 17, feeders 24 and 25 and transporting means 27. However, it is preferred to use devices in which the residence amounts or residence times of particles are small or short as is seen from the foregoing illustration. From this viewpoint, it is preferred that a fluidized bed cooler be used as the cooler and a multi-stage mechanical sieving machine using screens or a pneumatic classifying device capable of attaining both cooling and classifying effects, especially a zigzag type multi-stage pneumatic classifying device, is preferred as the classifier. As the feeder, there are preferably employed a screw feeder, a belt feeder, a vibrating feeder and a table feeder, and as the transporting means, a pneumatic conveyor or a belt conveyor is preferably used in carrying out this invention.

In addition to the embodiments shown in FIGS. 3 and 4, this invention includes various embodiments in which selection of one or two kinds of solid small particles, combinations of the respective devices and selection of the process steps are appropriately changed or modified. Some of these embodiments will now be described as examples of the practical application of this invention.

Figure 5:
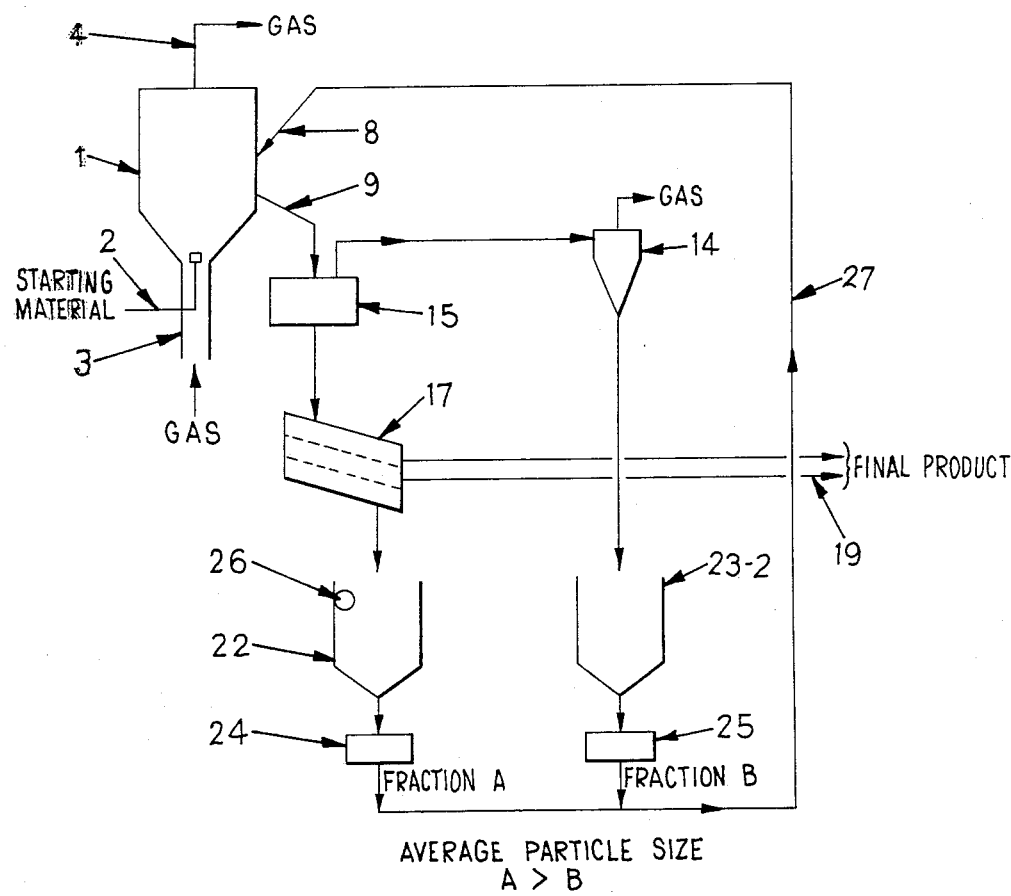
Figure 6:
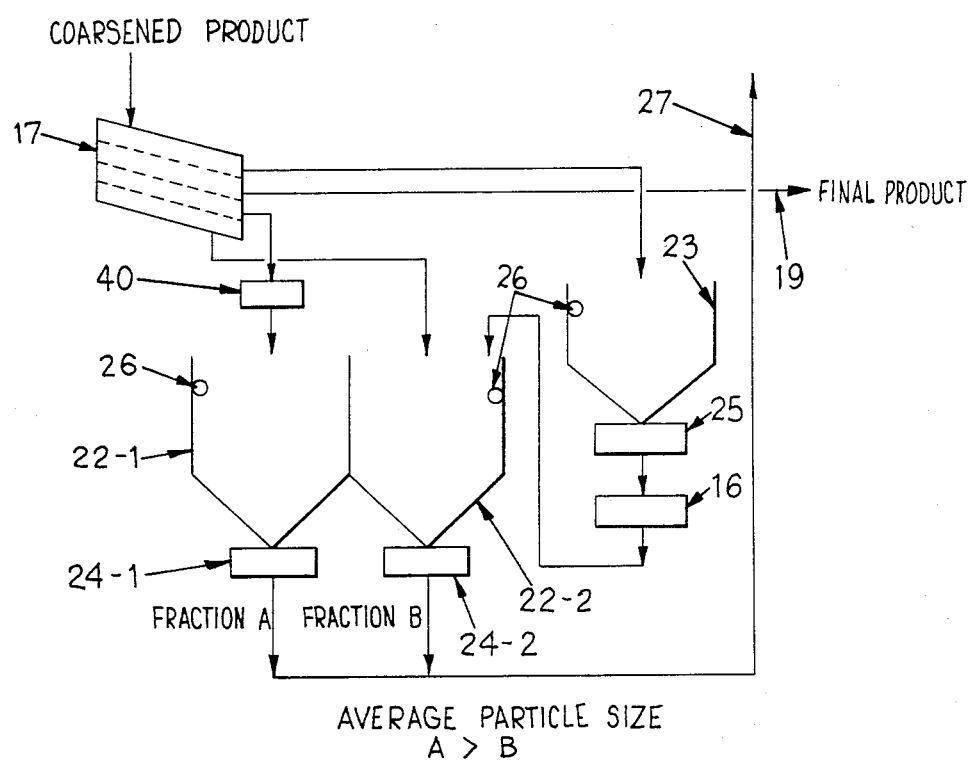

In each of the embodiments shown in FIGS. 5 and 6, the solid small particles are gathered in one group. In the embodiment shown in FIG. 5, only solid fine particles separated and recovered from the cooling system for cooling the coarsened product from the granulator are used as the solid small particles. In the embodiment shown in FIG. 6, when the cooled coarsened product is sieved by a three-stage sieving machine 17 and classified into the larger granular product, the final product and the smaller powdery or granular product, separation of particles having a small average particle size, which are to be used as the solid small particles, from the smaller powdery or granular product is simultaneously effected, and the thus-separated particles having a small average particle size and small particles obtained by pulverization of the larger granular product are charged in a storage tank 22-2 and they are used as the solid small particles.

Figure 7:
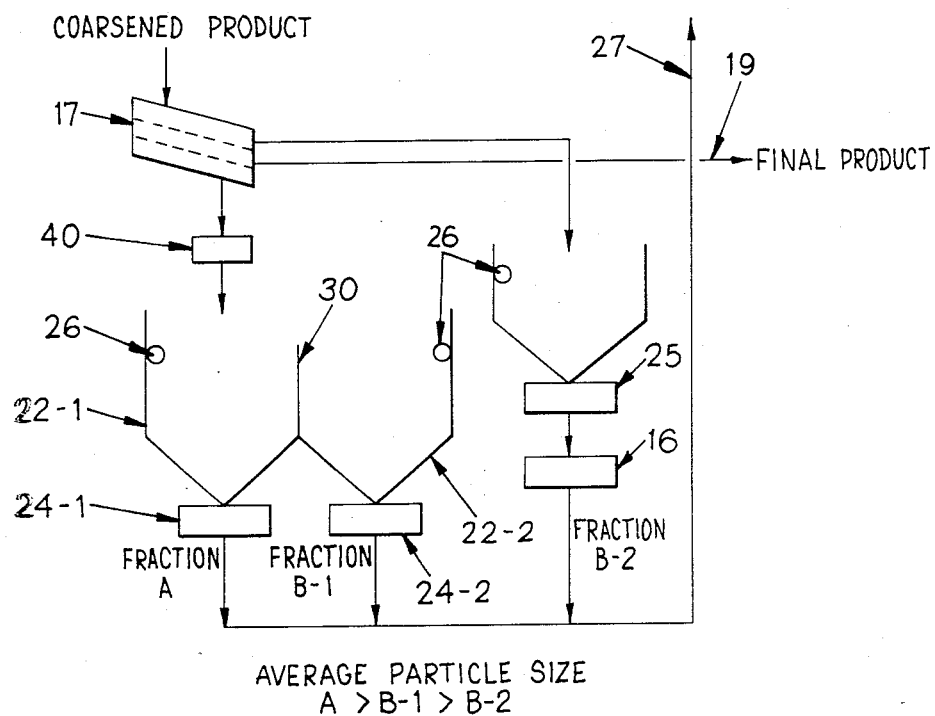
Figure 8:
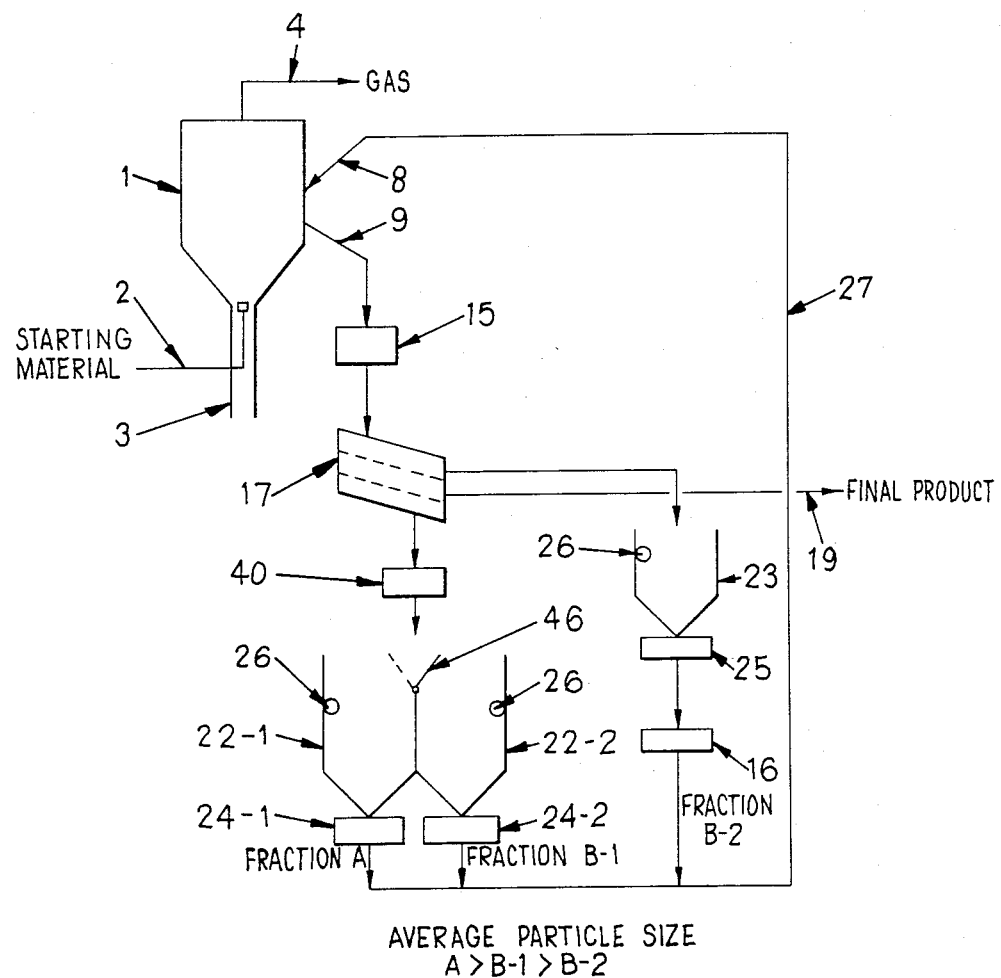
Figure 9:
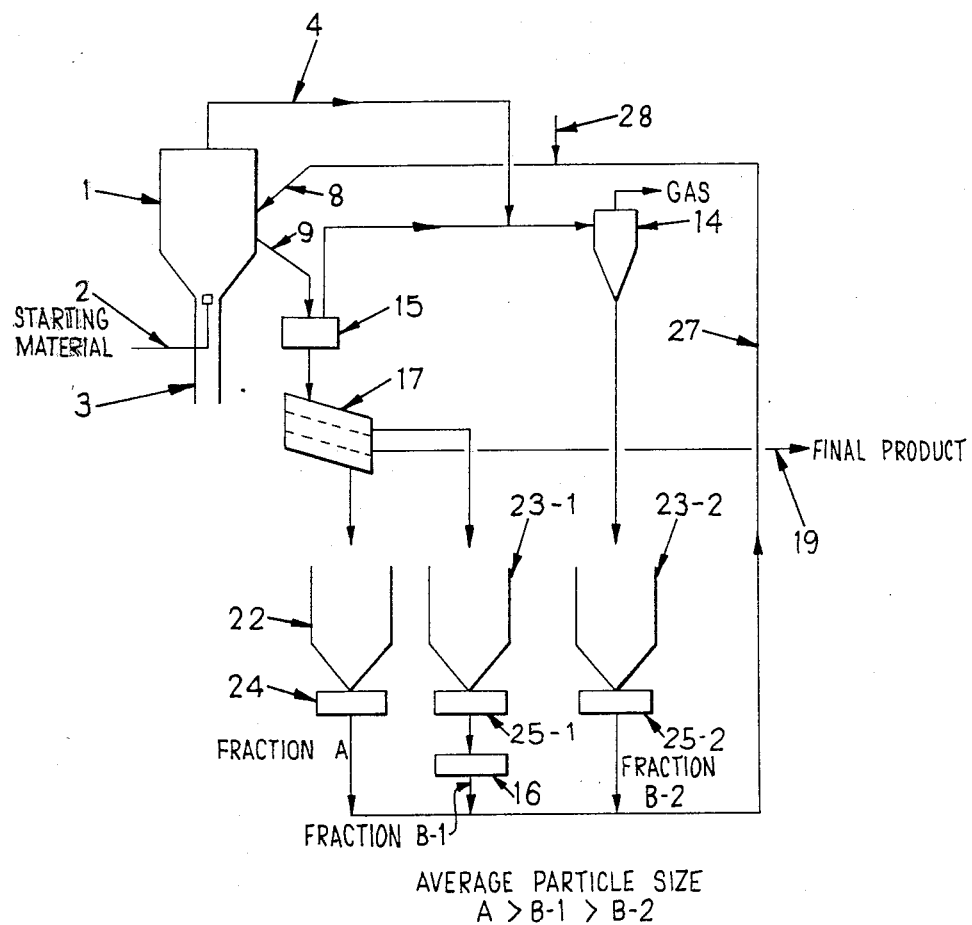

In each of the embodiments shown in FIGS. 7, 8 and 9, two kinds of particles differing in the average particle size are used as the solid small particles (fraction B). In the embodiment shown in FIG. 7, the storage tank 22 for the smaller powdery or granular product fraction A is partitioned at lower and middle height parts thereof into a storage tank 22-1 and a storage tank 22-2 by a partition wall 30 which is lower than the side walls, and the upper part of the storage tank 22 is used as a common space for the storage tanks 22-1 and 22-2. The smaller powdery or granular product is charged into the storage tank 22-1. As pointed out hereinbefore, it is when the average particle size of the smaller powdery or granular product, as well as the average particle size of the coarsened product, is decreasing that the flow amount of the smaller powdery or granular product is increased and the level of the particles stored in the storage tank 22-1 is elevated. If the storage tank 22 having the above-mentioned structure is used, when the average particle size of the smaller powdery or granular product is reduced substantially to the lower limit and the flow amount thereof is increased substantially to the upper limit, the smaller powdery or granular product can be allowed to overflow from the storage tank 22-1 and can be introduced into the storage tank 22-2. In the embodiment shown in FIG. 7, this overflowing smaller powdery or granular product having a smaller average particle size and particles obtained by pulverization of the larger granular product are used as the solid small particles.

In the embodiment shown in FIG. 8, the portion having a smaller average particle size in the smaller powdery or granular product is separated by switching means such as a movable damper 46, instead of the overflowing means adopted in the embodiment shown in FIG. 7. In this embodiment, approach of the average particle size of the smaller powdery or granular product to the lower limit is detected by a flow meter 40 which acts as detecting means in the embodiment shown in FIG. 8. Namely, this approach is detected by the fact that the value on the flow meter 40 indicates that the flow amount of the smaller powdery or granular product is increased substantially to the upper limit. The smaller powdery or granular product at the point of detection of the above-mentioned approach, that is, at the point when the average particle size of the smaller powdery or granular product is reduced substantially to the lower limit, is guided into the storage tank 22 by switching means such as the damper 46 and the portion having a smaller average particle size is thus separated from the smaller powdery or granular product. This portion and particles obtained by pulverization of the larger granular product are used as the solid small particles.

In the embodiment shown in FIG. 9, particles obtained by pulverization of the larger granular product and solid fine particles separated from the exhaust air from the granulator 1 and cooler 15 and used as the solid small particles.

In carrying out this invention, some small irregular variations are often observed with respect to the detected values of the average particle size of the coarsened product etc., In this case, calculations for rendering these irregular variations more uniform may be performed by an electronic computer capable of performing the necessary calculations and having the necessary memory storage capacities. Furthermore, such electronic computer can be used for performing calculations of changes of the various detected values with the passing of time, determining the timing of effecting the change of the feed ratio based on results of these calculations and carrying out this change of the feed ratio. By performing these operations automatically by using such electronic computer, the effects of this invention can be further enhanced.

In a special embodiment of the process of this invention, there is no need to set an upper limit of the desired particle size of the final product for the classification of the coarsened product. In other words, in this case, the maximum particle size in the larger granular product is reduced by virtue of the effects of this invention, and the maximum particle size in the larger granular product is smaller than the upper limit of the desired particle size of the final product. Also in this case, this invention can be carried out advantageously and conveniently. For example, in the embodiment shown in FIG. 5, the larger granular product is withdrawn from the granulation system. However, in this embodiment, this withdrawn larger granular product can be treated as a final product when its largest particle size is not more than the upper limit of the desired particle size of the final product. In this embodiment, the coarsened product may be classified into only two fractions, that is, the final product having a particle size not smaller than the lower limit and, of course, not larger than the upper limit of the desired particle size and the smaller powdery or granular product having a particle size smaller than the lower limit of the desired particle size. In this embodiment, the machine for classifying the coarsened product is simplified and the machine for pulverizing the larger granular product need not be used. Therefore, this embodiment is especially preferred for carrying out this invention.

This invention will now be described in detail with reference to the following Examples.

EXAMPLE 1

According to the process shown in FIG. 3, an operation for obtaining urea particles having a particle size of 3 to 5 mm was carried out by using a granulator having a powdery or granular product resident capacity of 0.18 m$^3$ and a smaller powdery or granular product storage tank 22 having an internal capacity of 0.4 m$^3$. The height of the level of particles in the smaller powdery or granular product storage tank was used as means for detecting the change of the average particle size of the coarsened product. The operation was conducted under the following conditions.

Rate of blowing air into granulator: 3900 Nm$^3$/hr
Temperature of air blown into granulator: 23°–28° C. (ambient temperature)
Amount of molten urea sprayed into granulator: 2200 kg/hr
Temperature of molten urea sprayed: 138° C.
Water content in molten urea sprayed: 0.3%
First set value in smaller powdery or granular product storage tank 22: 0.28 m$^3$ from bottom
Second set value in smaller powdery or granular product storage tank 22: 0.20 m$^3$ from bottom
The obtained results were as shown below.
Change of yield of final product: 22.5 Kg/min (minimum) to 38.4 Kg/min (maximum)
Content of larger granular product in coarsened product: 0% (minimum) to 6% (maximum)
Content of smaller powdery or granular product in coarsened product: 40.0% (minimum) to 60.0% (maximum)
Change of level of particles in smaller powdery or granular product storage tank: 0.1 m$^3$ (minimum) to 0.35 m$^3$ (maximum)
Average value of ratio of amount of recycled product to amount sprayed of molten urea: 1.0
Temperature within granulator: 112° to 117° C.

For comparison, according to the process shown in FIG. 3, the operation was carried out under the same conditions as described above except that the change of the feed ratio was not effected between the smaller powdery or granular product and the solid small particles, but rather, all of the smaller powdery or granular product and all of particles obtained by pulverizing the larger granular product and solid fine particles separated from the exhaust air from the granulator were recycled as the solid small particles (corresponding to the operation carried out according to the process shown in FIG. 2). In this case, the amount of the recycled product was extremely changed, and since the action of cooling the interior of the granulator by the recycled product was reduced when the amount of the recycled product was decreased, the temperature within the granulator was elevated and melt adhesion of solid powdery or granular products in the granulator took place, rendering continuation of the operation impossible. Reduction of the amount sprayed of molten urea for preventing occurrence of this undesired phenomenon of melt adhesion of solid particles was not preferred because the manufacturing capacity of the total granulation system was reduced and the consumption of the energy per unit amount of the final product was increased. In this comparative run, if the amount supplied of the smaller powdery or granular product was adjusted to a certain intermediate value between the maximum and minimum amounts of the smaller powdery or granular product, the storage tank 22 for the smaller powdery or granular product became emtpy or the smaller powdery or granular product overflowed from the storage tank 22 and the storage tank 23 became empty. If this storage tank 22 became emtpy, supply of the recycled particles was extremely reduced to excessively elevate the temperature within the granulator, with the result being that the melting phenomenon of the particles resident in the granulator was caused as described above. Indeed, continuation of the operation became possible only if the capacity of the smaller powdery or granular product storage tank 22 was remarkably increased. However, variations of the yield of the final product were extreme and a large quantity of the larger granular product was formed. Accordingly, the overall operation efficiency was extremely low.

EXAMPLE 2

According to the process shown in FIG. 9, the operation for obtaining urea particles having a particle size of 1.68 to 3.36 mm was carried out by using the same granulator and smaller powdery or granular product storage tank 22 as used in Example 1 under operation conditions described below. In this Example, particles obtained by pulverizing the larger granular product were used as solid small particles having a medium particle size, and solid fine particles separated from the exhaust air from the granulator and air fluidized bed cooler 15 were used as solid small particles having a small particle size, and the change of the feed ratio was effected among these two kinds of the small solid particles and the smaller powdery or granular product while fixing the feed ratio between the smaller powdery or granular product and the solid small particles having a small particle size but changing the feed ratio between the sum of these two kinds of the particles and the solid small particles having a medium particle size. The first and second set values used were determined based on the height of the level of particles stored in the smaller powdery or granular product storage tank. The operation conditions adopted were as follows.

Rate of blowing air into granulator: 3700 Nm$^3$/hr
Temperature of air blown into granulator: 18°–23° C. (ambient temperature)
Amount of molten urea sprayed into granulator: 2100 Kg/hr
Temperature of molten urea fed into granulator: 138° C.
Water content in molten urea fed into granulator: 0.3%

First set value of level of smaller powdery or granular product storage tank 22: 0.17 m³ from bottom Second set value of level of smaller powdery or granular product storage tank 22: 0.17 m³ from bottom Ratio of amount fed or smaller powder or granular product to amount fed of solid small particles having small particle size: 1/0.05

The results obtained by the above operation were as follows.

Change of yield of final product: 30.9 Kg/min (minimum) to 32.5 Kg/min (maximum)

Change of level in smaller powdery or granular product storage tank 22: 0.15 m³ (minimum) to 0.19 m³ (maximum)

Content of larger granular product in coarsened product: 0% (minimum) to 2.3% (maximum)

Content of smaller powdery or granular product in coarsened product: 41.2% (minimum) to 48.8% (maximum)

Average value of ratio of amount of recycled product to amount sprayed of molten urea: 0.8

Temperature within granulator: 112° to 117° C.

EXAMPLE 3

According to the process shown in FIG. 9, the operation for obtaining a granular compound fertilizer containing nitrogen, phosphoric acid and potassium and having a particle size of 3 to 5 mm was carried out substantially in the same manner as described in Example 2. Ammonium primary phosphate was used as the nitrogen and phosphoric acid source, and finely divided potassium chloride was used as the potassium source. The particle size distribution of finely divided potassium chloride was substantially uniform. A mixture comprising 623 Kg of urea, 808 Kg of ammonium primary phosphate and 103 Kg of water was heated and melted at 105° C. and was used as the concentrated liquid to be sprayed into the granulator. Potassium chloride was quantitatively supplied from the outside through a seed particle feed opening indicated by reference numeral 28 in FIG. 9. The operation was conducted under the following conditions by using the above-mentioned starting materials.

Rate of air blown into granulator: 4000 Nm³/hr

Temperature of air blown into granulator: 20°–30° C. (ambient temperature)

Amount of melt sprayed into granulator: 1534 Kg/hr

Temperature of melt fed into granulator: 105° to 110° C.

First set value of level in smaller powdery or granular product storage tank 22: 0.17 m³ from bottom Second set value of level in smaller powdery or granular product storage tank 22: 0.17 m³ from bottom Ratio of amount fed of smaller powdery or granular product to amount fed of solid small particles having small particle size: 1/0.05

Feed rate of potassium chloride: 63 Kg/hr

The results obtained by the above operation were as follows.

Change of yield of final product: 32.5 Kg/min (minimum) to 34.2 Kg/min (maximum)

Content of larger granular product in coarsened product: 0% (minimum) to 3.5% (maximum)

Content of smaller powdery or granular product in coarsened product: 45.2% (minimum) to 50.5% (maximum)

Change of level in smaller powdery or granular product storage tank 22: 0.14 m³ (minimum) or 0.20 m³ (maximum)

Ratio of amount of recycled product to amount sprayed of melt: 1.0

Temperature within granulator: 70° to 80° C.

EXAMPLE 4

According to the process shown in FIG. 9, the operation for obtaining granular urea having a particle size range of from 0.07 to 5 mm was carried out under the following conditions by using the same apparatus as used in Example 2.

Rate of air blown into granulator: 4300 Nm³/hr

Temperature of air blown into granulator: 10°–15° C.

Amount of molten urea sprayed into granulator: 1750 Kg/hr

Temperature of molten urea fed into granulator: 138° C.

Water content in molten urea fed into granulator: 0.3%

First set value of level in smaller powdery or granular product storage tank 22: 0.17 m³ from bottom Second set value of level in smaller powdery or granular product storage tank 22: 0.17 m³ from bottom Ratio of amount supplied of smaller powdery or granular product to amount supplied of solid small particles having small particle size: 0.5/1

The results obtained by the operation were as follows.

Change of yield of final product: 27.8 Kg/min (minimum) to 29.9 Kg/min (maximum)

Content of larger granular product in coarsened product: 0% (minimum) to 1.5% (maximum)

Content of smaller powdery or granular product in coarsened product: 5.88% (minimum) to 7.25% (maximum)

Ratio of amount of recycled product to amount sprayed of molten urea: 0.07

Temperature within granulator: 113° to 116° C.

EXAMPLE 5

According to the process shown in FIG. 9, a granular product of ammonium nitrate having a particle size of 3 to 5 mm was prepared substantially in the same manner as described in Example 2. The operation was carried out under the following conditions.

Rate of air blown into granulator: 4000 Nm³/hr

Temperature of air blown into granulator: 70°–80° C.

Amount sprayed of molten ammonium nitrate fed into granulator: 2200 Kg/hr

Temperature of molten ammonium nitrate fed into granulator: 155° to 170° C.

Water content in molten ammonium nitrate fed into granulator: 4%

First set value of level in smaller powdery or granular product storage tank 22: 0.17 m³ from bottom Second set value of level in small powdery or granular product storage tank 22: 0.17 m³ from bottom Ratio of amount supplied of smaller powdery or granular product to amount supplied of solid small particles having small particle size: 1/1.0 to 1/0.05

The results obtained by the above operation were as follows.

Change of yield of final product: 30 Kg/min (minimum) to 38.3 Kg/min (maximum)

Change of level of particles: 0.15 m³ from bottom (minimum) to 0.19 m³ from bottom (maximum)

Ratio of amount of recycled product to amount sprayed of melt: 0.7

Temperature within granulator: 100° to 105° C.

Content of larger granular product in coarsened product: 0% (minimum) to 3.4% (maximum)

Content of smaller powdery of granular product in coarsened product: 37% (minimum) to 50.7% (maximum)

In the foregoing description, there has been described the case where one jet stream causing the phenomenon of coarsening particles is formed in the granulator. If desired, this invention can be applied to an embodiment in which a plurality of particle layers and a plurality of jet streams are formed in one granulator or another embodiment in which a plurality of granulators, each having one jet stream formed therein, are arranged in series or in parallel or in a checkered pattern and particles to be treated are passed through these granulators in series or in parallel and then discharged from the granulation system. When a plurality of jet streams or granulators are used, the tendency of the particle size distribution to vary becomes more prominent and, therefore, the effect of adjusting the particle size according to the granulation process of this invention becomes more valuable.

The embodiments of the invention in which an exclusive property or privilege is claimed are defined as follows:

1. A granulation process comprising:
   (a) spraying droplets of a liquid, adhesive, solidifiable substance into a stream of gas;
   (b) flowing said stream of gas containing said droplets into contact with solid seed particles in a granulator thereby causing said droplets to adhere to and thus enlarge said seed particles;
   (c) discharging enlarged seed particles from the granulator:
   (d) separating said enlarged seed particles into at least three fractions comprising (i) a final granular product having a range of particle sizes within the desired range, (ii) a smaller granular product having a range of particle sizes smaller than the desired particle size range, and (iii) a larger granular product having a range of particles sizes larger than the desired particle size range;
   (e) continuously feeding said smaller granular product (ii) at a rate independent of the rate at which said smaller granular product (ii) is obtained in step (d) and mixing same with (iv) solid small particles appropriate for use as seed particles in said granulator and having an average particle size smaller than the average particle size of said smaller granular product (ii), thereby forming a mixture;
   (f) feeding said mixture into the granulator so that the particles of said mixture serve as solid seed particles in the granulator; and
   (g) altering the amount of said solid small particles (iv) mixed with said smaller granular product (ii) in step (e), in response to the average particle size of said enlarged seed particles discharged from the granulator
     (1) to reduce the average particle size of said mixture when the average particle size of said enlarged seed particles increases so as to maintain the maximum content of said larger granular product (iii) in said enlarged seed particles below 10 wt. %, and
     (2) to increase the average particle size of said mixture when the average particle size of said enlarged seed particles decreases so as to maintain the maximum content of said smaller granular product (ii) in said enlarged seed particles below 75 wt. %, thereby controlling variations in the average particle size of said enlarged seed particles discharged from the granulator.

2. A granulation process which comprises:
   (a) spraying droplets of a liquid, adhesive, solidifiable substance into a stream of gas;
   (b) flowing said stream of gas containing said droplets into contact with solid seed particles in a granulator thereby causing said droplets to adhere to and thus enlarge said seed particles;
   (c) discharging enlarged seed particles from the granulator;
   (d) separating said enlarged seed particles into at least two fractions comprising a first fraction comprising particles having a range of particle sizes within the desired range and a second fraction (A) of a smaller granular product having a range of particle sizes smaller than the desired particle size range;
   (e) continuously feeding said second fraction (A) at a rate independent of the rate at which said second fraction (A) is obtained in step (d) and mixing same with solid small particles (B) appropriate for use as seed particles in the granulator and having an average particle size smaller than the average particle size of said second fraction (A), thereby forming a mixture;
   (f) feeding said mixture into the granulator so that the particles of said mixture serve as solid seed particles in the granulator; and
   (g) altering the amount of said solid small particles (B) mixed with said second fraction (A) in step (e), in response to the average particle size of said enlarged seed particles discharged from the granulator
     (1) to reduce the average particle size of said mixture when the average particle size of said enlarged seed particles increases so as to maintain the maximum content of particles larger than the desired particle size range in said enlarged seed particles below 10 wt. %, and
     (2) to increase the average particle size of said mixture when the average particle size of said enlarged seed particles decreases so as to maintain the maximum content of said second fraction (A) in said enlarged seed particles below 75 wt. %, thereby controlling variations in the average particle size of said enlarged seed particles discharged from the granulator.

3. A granulation process comprising:
   (a) spraying droplets of a liquid, adhesive, solidifiable substance into a stream of gas;
   (b) flowing said stream of gas containing said droplets into contact with solid seed particles in a granulator thereby causing said droplets to adhere to and thus enlarge said seed particles;
   (c) discharging enlarged seed particles from the granulator;
   (d) separating said enlarged seed particles into at least three fractions comprising (i) a final granular product having a range of particle sizes within the desired range, (ii) a smaller granular product having a range of particle sizes smaller than the desired particle size range, and (iii) a larger granular product having a range of particle sizes larger than the desired particle size range;

(e) feeding said smaller granular product (ii) into a first storage device and storing same therein;

(f) feeding said larger granular product (iii) into a second storage device and storing same therein;

(g) continuously feeding said smaller granular product (ii) and said larger granular product (iii) from their respective storage devices at selectable rates which are independent of the rates at which said smaller granular product (ii) and said larger granular product (iii) are fed into said storage devices, pulverizing said larger granular product (iii) to obtain (iv) solid small particles which are appropriate for use as seed particles in the granulator and have an average particle size smaller than the average particle size of said smaller granular product (ii) and then mixing said smaller granular product (ii) and said solid small particles (iv) together to form a mixture;

(h) feeding said mixture into the granulator so that the particles of said mixture serve as solid seed particles in the granulator; and (i) altering the relative rates of feeding said smaller granular product (ii) and said larger granular product used to prepare said solid small particles (iv) in step (g), in response to the average particle size of said enlarged seed particles discharged from the granulator, (1) to reduce the average particle size of said mixture when the average particle size of said enlarged seed particles increases above a first set value so as to maintain the maximum content of said larger granular product (iii) in said enlarged seed particles below 10 wt. %, and (2) to increase the average particle size of said mixture when the average particle size of said enlarged seed particles decreases below a second set value so as to maintain the maximum content of said smaller granular product (ii) in said enlarged seed particles below 75 wt. %, thereby controlling variations in the average particle size of said enlarged seed particles discharged from the granulator.

4. A granulation process which comprises spraying droplets of a liquid, adhesive, solidifiable substance into a stream of gas and then flowing said stream of gas containing said droplets in contact with solid seed particles in a granulator to cause said droplets to adhere to and solidify on said seed particles whereby to form size-enlarged granules; discharging said granules from said granulator as a coarsened product; classifying said coarsened product into at least a final granular product and a smaller powdery or granular product (A) having an average particle size smaller than the average particle size of said final granular product; storing said smaller powdery or granular product (A) in a first storage device, storing solid small particles (B) in a second storage device, said solid small particles (B) being appropriate for use as seed particles in the granulator and having an average particle size smaller than the average particle size of (A); continuously feeding (A) and (B) from said storage devices at selectable rates which are independent of the rate at which said product (A) is fed into said first storage device and mixing them together to form a mixture; then feeding the mixture of (A) and (B) into said granulator to provide said seed particles in said granulator and adjusting the relative amounts of (A) and (B) in the mixture of (A) and (B) so as to maintain the following limit conditions in said coarsened product (a) the content of particles having an average particle size at least as large as the average particle size of said final granular product is at least 10% by weight, based on the total weight of said coarsened product, and (b) the content of (A) is less than 75% by weight, based on the total weight of said coarsened product.

5. In a granulation process comprising the steps of: feeding solid seed particles to a spouted bed granulator; spraying droplets of a liquid, adhesive, solidifiable substance into a stream of a gas; flowing said stream of gas containing said droplets into the granulator at the bottom thereof and into contact with said seed particles contained in the granulator so as to form a spouted bed, thereby causing said droplets to contact said seed particles in said spouted bed so that said droplets adhere to said seed particles to effect size enlargement thereof; discharging a coarsened product consisting of enlarged seed particles from the granulator; classifying said coarsened product into at least two fractions including a granular product (1) having a range of particle sizes not smaller than the lower limit of the desired particle size range for the final product granules, and a smaller powdery or granular product (2) having a range of particle sizes smaller than said lower limit of said desired particle size range; recycling said smaller powdery or granular product (2) as the seed particles fed into the granulator, and withdrawing final product granules having said desired particle size range, the improvement which comprises:

(I) continuously feeding said smaller powdery or granular product (2) at a rate independent of the rate at which said product (2) is obtained from said granulator and adding to the thus-fed smaller powdery or granular product (2) an amount of solid small particles (3) having an average particle size smaller than the average particle size of said smaller powdery or granular product (2), thereby forming a mixture;

(II) continuously recycling said mixture of said product (2) and particles (3) to said granulator, so that said mixture serves as the seed particles fed into the granulator;

(III) in said coarsened product discharged from the granulator, maintaining the content of a larger granular product (4) having a particle size larger than the upper limit of said desired particle size range for the final product granules below 10 wt. % by changing the ratio of the amount of said solid small particles (3) to the amount of said smaller powdery or granular product (2) so as to reduce the average particle size of said mixture resulting from said addition step (I) when the average particle size of the coarsened product discharged from the granulator is increasing;

(IV) maintaining the content of said smaller powdery or granular product (2) in the coarsened product discharged from the granulator below 75 wt. % by changing said ratio of the amount of said solid small particles (3) to the amount of said smaller powdery or granular product (2) so as to increase the average particle size of said mixture resulting from said addition step (I) when the average particle size of the coarsened product discharged from the granulator is decreasing, and (V) alternately executing said steps (III) and (IV), so that fluctuations of the particle size distribution in said coarsened product discharged from the granulator are reduced.

6. A granulation process according to claim 5, wherein the improvement further comprises classifying said coarsened product into three fractions including (A) a granular product (5) having a particle size range within said desired particle size range of the final product granules, which product (5) is said final product, (B) said smaller powdery or granular product (2), and (C) said larger granular product (4) having a particle size range larger than the upper limit of said desired particle size range of said final product granules.

7. A granulation process according to claim 5, wherein the improvement further comprises classifying said coarsened product into two fractions including (A) a granular product (5) having a particle size range within the desired particle size range of the final product, which product (5) is said final product, and (B) said smaller powdery or granular product (2).

8. A granulation process according to claim 5, wherein the improvement further comprises said solid small particles (3) are of at least one kind selected from the group consisting of:
(i) solid small particles separated from said smaller powdery or granular product (2),
(ii) solid fine particles separated from exhaust gases from said granulator and solid fine particles separated from exhaust gases from air coolers used to cool said coarsened product,
(iii) starting solid small particles of a substance used for formation of said liquid to be sprayed into said granulator;
(iv) solid small particles composed of a chemical component to be incorporated into the coarsened product and different from the substance contained in the sprayed droplets of said liquid, and
(v) solid small particles obtained by pulverization of said larger granular product (4); and further comprising dividing said solid small particles into two groups differing in average particle size.

9. A granulation process according to claim 5, wherein the improvement further comprises the ratio of the amount of said coarsened product resident in the granulator to the amount of said smaller powdery or granular product (2) resident in the granulation system between the coarsened product discharge end of the granulator and the seed particle introduction end of the granulator including the recycle passage is in the range of from 1/1 to 1/20.

10. A granulation process as claimed in claim 5 in which the improvement further comprises that the average particle size of said solid small particles (3) is in the range from 1/30 to ⅔ the average particle size of said smaller powdery or granular product (2).

11. A granulation process as claimed in claim 5, wherein the improvement further comprises the step of monitoring a condition indicative of the average particle size of said coarsened product, and said steps (III) and (IV) are carried out by decreasing the weight ratio of product (3) to product (2) in said recycled mixture after said addition step (I) so as to make the average particle size of said recycled particles after said addition step (I) larger when the monitored condition indicates that the average particle size of said coarsened product is diminishing and is approaching a first predetermined limit, and increasing the weight ratio of product (3) to product (2) in said recycled mixture after said addition step (I) so as to make the average particle size of said recycled particles after said addition smaller when the monitored condition of the average particle size of said coarsened product is increasing and is approaching a second predetermined limit.

12. A granulation process according to claim 5, wherein the improvement further comprises that the sprayed droplets of said liquid are substantially composed of urea, the temperature within the granulator is maintained in the range of from 90° to 120° C. and the total amount of the smaller powdery or granular product (2) and solid small particles (3) recycled to the granulator is 0.05 to 1.5 times the amount of the sprayed droplets of said urea liquid.

13. A granulation process as claimed in claim 5, wherein the improvement further comprises that solid small particles (3) are obtained from said coarsened product by separation from said coarsened product.

14. A granulation process as claimed in claim 5, wherein the improvement comprises that said solid small particles (3) consist essentially of a mixture of pulverized particles of said larger granular product (4) and solid fine particles separated from gas discharged from said granulator.

15. A granulation process as claimed in claim 8, wherein the improvement comprises that said coarsened product is classified to obtain said solid small particles (i), and said solid small particles (3) consist essentially of said solid small particles (i) and said solid small particles (v), wherein said solid small particles (v) have a smaller average particle size than said solid small particles (i).

16. A granulation process as claimed in claim 13, wherein the improvement further comprises, prior to said classifying step, a step of separating solid small particles (3) from said coarsened product.

17. A granulation process as claimed in claim 8, wherein the improvement further comprises classifying said coarsened product to obtain said larger granular product (4) having an average particle size larger than the upper limit of the desired particles size range of said final product, pulverizing said larger granular product (4) to obtain solid small particles (V) which comprise a portion of said solid small particles (3), and utilizing a mixture of said solid small particles (V) and solid small particles (i) as said solid small particles (3).

18. A granulation process according to claim 7, wherein the improvement further comprises that said solid small particles (3) are of at least one kind selected from the group consisting of:
(i) solid small particles separated from said smaller powdery or granular product (2),
(ii) solid fine particles separated from the exhaust gases from said granulator and solid fine particles separated from exhaust gases from air coolers used to cool said coarsened product,
(iii) starting solid small particles of said substance used for formation of said liquid to be sprayed into said granulator; and
(iv) solid small particles composed of a chemical component to be incorporated into the coarsened product and different from the substance contained in the sprayed droplets of said liquid; and further comprising dividing said solid small particles (3) into two groups differing in average particle size.

19. A granulation process as claimed in claim 5, wherein the improvement further comprises classifying said coarsened product to obtain a fraction having an average particle size larger than the average particle size range of said final granular product, and pulverizing said fraction to obtain said solid small particles (3).

20. A granulation process comprising:
 (a) spraying droplets of a liquid, adhesive, solidifiable substance into a stream of gas;
 (b) flowing said stream of gas containing said droplets into contact with solid seed particles in a granulator thereby causing said droplets to adhere to and thus enlarge said seed particles;
 (c) discharging enlarged seed particles from the granulator;
 (d) separating said enlarged seed particles into at least three fractions comprising (1) a final granular product having a range of particle sizes within the desired range, (2) a smaller granular product having a range of particle sizes smaller than the desired particle size range, and (3) a larger granular product having a range of particle sizes larger than the desired particle size range;
 (e) designating a first set value of the discharge rate of said smaller product (2) being discharged from said granulator, which discharge rate of said smaller product (2) decreases as the average particle size of said enlarged seed particles increases and which discharge rate increases as the average particle size of said enlarged seed particles decreases;
 (f) designating a second set value of the discharge rate of said smaller product (2) being discharged from said granulator, which second set value is higher than said first set value;
 (g) continuously feeding said smaller granular product (2) at a rate independent of the rate at which said smaller granular product (2) is obtained in step (d) and mixing same with (4) solid small particles appropriate for use as seed particles in said granulator and having an average particle size smaller than the average particle size of said smaller granular product (2), thereby forming a mixture;
 (h) feeding said mixture into the granulator so that the particles of said mixture serve as solid seed particles in the granulator;
 (i) altering the amount of said solid small particles (4) mixed with said smaller granular product (2) in step (g), in response to the average particle size of said enlarged seed particles discharged from the granulator
  (I) to reduce the average particle size of said mixture when the average particle size of said enlarged seed particles increases such that the discharge rate of said smaller product (2) being discharged from said granulator decreases to reach said first set value, so as to maintain the maximum content of said larger granular product (3) in said enlarged seed particles below 10 wt. %, and
  (II) to increase the average particle size of said mixture when the average particle size of said enlarged seed particles decreases such that the discharge rate of said smaller product (2) being discharged from said granulator increases to reach said second set value, so as to maintain the maximum content of said smaller granular product (2) in said enlarged seed particles below 75 wt. %,
 thereby controlling variations in the average particle size of said enlarged seed particles discharged from the granulator; and
 (j) continuously repeating steps (a)–(i) until a sufficient quantity of said final granular product (1) has been obtained.

21. A granulation process which comprises:
 (a) spraying droplets of a liquid, adhesive, solidifiable substance into a stream of gas;
 (b) flowing said stream of gas containing said droplets in contact with solid seed particles in a granulator thereby causing said droplets to adhere to and thus enlarge said seed particles;
 (c) discharging enlarged seed particles from the granulator;
 (d) separating said enlarged seed particles into at least two fractions comprising a first fraction comprising particles having a range of particle sizes within a desired range and a second fraction (A) of a smaller granulated product having a range of particle sizes smaller than said desired particle size range;
 (e) designating a first set value of the discharge rate of said second fraction (A) being discharged from said granulator, which discharge rate of said second fraction (A) decreases as the average particle size of said enlarged seed particles increases and which discharge rate increases as the average particle size of said enlarged seed particles decreases;
 (f) designating a second set value of the discharge rate of said second fraction (A) being discharged from said granulator, which second set value is higher than said first set value;
 (g) continuously feeding said second fraction (A) at a rate independent of the rate at which said second fraction (A) is obtained in step (d) and mixing same with solid small particles (B) appropriate for use as seed particles in the granulator and having an average particle size smaller than the average particle size of said second fraction (A), thereby forming a mixture;
 (h) feeding said mixture into the granulator so that the particles of said mixture serve as solid seed particles in the granulator;
 (i) altering the amount of said solid small particles (B) mixed with said second fraction (A) in step (g), in response to the average particle size of said enlarged seed particles discharged from the granulator
  (1) to reduce the average particle size of said mixture when the average particle size of said enlarged seed particles increases such that the discharge rate of said second fraction (A) being discharged from said granulator decreases to reach said first set value, so as to maintain the maximum content of particles larger than the desired particle size range in said enlarged seed particles below 10 wt. %, and
  (2) to increase the average particle size of said mixture when the average particle size of said enlarged seed particle decreases such that the discharge rate of said second fraction (A) being discharged from said granulator increases to reach said second set value, so as to maintain the maximum content of said second fraction (A) in said enlarged seed particles below 75 wt. %,
 thereby controlling variations in the average particle size of said enlarged seed particles discharged from the granulator; and
 (j) continuously repeating steps (a)–(i) until a sufficient quantity of said final granular product has been obtained.

* * * * *

UNITED STATES PATENT AND TRADEMARK OFFICE
CERTIFICATE OF CORRECTION

PATENT NO. : 4 501 773

DATED : February 26, 1985

INVENTOR(S) : Susumu NIOH et al

It is certified that error appears in the above-identified patent and that said Letters Patent is hereby corrected as shown below:

On the title page, at item [75] please add the following additional inventor ---MASAKI NARUO, Mobara, Japan---.

Signed and Sealed this

Eighth Day of October 1985

[SEAL]

Attest:

DONALD J. QUIGG

Attesting Officer

Commissioner of Patents and
Trademarks—Designate